United States Patent [19]

Shadle

[11] 4,082,877
[45] Apr. 4, 1978

[54] UNORIENTED COMPOSITE LAMINAR FILM WITH AN ELASTOMERIC LAYER AND SEALABLE LAYER

[75] Inventor: Robert James Shadle, Greenville, S.C.

[73] Assignee: W. R. Grace & Co., Duncan, S.C.

[21] Appl. No.: 550,074

[22] Filed: Feb. 14, 1975

[51] Int. Cl.² .............. B65D 33/00; B65D 33/04; B65D 85/30; B65D 85/34

[52] U.S. Cl. ................................. 428/35; 428/220; 428/335; 428/425; 428/514; 428/515; 428/516; 428/517; 428/518; 428/520; 264/176 R; 264/22; 264/331; 206/819; 260/897 R; 426/392; 426/410; 526/340; 526/328.5; 526/329.1; 53/33; 53/34; 156/230; 156/244

[58] Field of Search ............... 428/500, 515, 514, 516, 428/517, 518, 520, 483, 335, 425, 35, 220

[56] References Cited

U.S. PATENT DOCUMENTS

| 3,496,061 | 2/1970 | Freshour et al. | 428/461 |
| 3,600,267 | 8/1971 | McFedries, Jr. et al. | 428/518 X |
| 3,607,505 | 9/1971 | Schirmer | 428/518 X |
| 3,647,485 | 3/1972 | Seiferth et al. | 428/518 X |
| 3,682,767 | 8/1972 | Britton et al. | 428/349 |
| 3,857,754 | 11/1974 | Hirata et al. | 428/474 X |
| 3,900,635 | 8/1975 | Funderburk et al. | 428/516 X |

FOREIGN PATENT DOCUMENTS

| 964,415 | 7/1964 | United Kingdom | 428/517 |
| 1,264,196 | 2/1972 | United Kingdom. | |

Primary Examiner—P. C. Ives
Attorney, Agent, or Firm—John J. Toney; William D. Lee, Jr.; John B. Hardaway

[57] ABSTRACT

Disclosed is an extensible composite laminar film useful for packaging which includes a first layer of elastomeric polymeric composition and one or more extensible sealable layers of polymeric composition including an interpolymer of ethylene and alkenoic acid or ionomeric salt thereof. In an embodiment the film has a tensile secant modulus of from about 1,000 to about 30,000 and preferably from about 1,000 to about 14,950 pounds per square inch. The film is prepared advantageously by hot blown coextrusion. When stretch wrapped about a variety of products the film typically exhibits a high degree of elastic recovery. Also disclosed is an elastomeric film-forming composition including an ethylene-vinyl acetate interpolymer and an ethylene-propylene interpolymer desirably having a density of not more than 0.92. The first layer of the film may effectively be prepared from the composition.

31 Claims, No Drawings

UNORIENTED COMPOSITE LAMINAR FILM WITH AN ELASTOMERIC LAYER AND SEALABLE LAYER

The present invention relates to an extensible composite laminar film, to compositions useful for forming films, to a method for forming an extensible composite laminar film, to a method for packaging, and to packages.

Extensible, stretchable, elastomeric, and/or elastic films for packaging are well known in the art. Films formed of polyvinyl chloride with various amounts of plasticizers incorporated therein have found use in a variety of packaging applications, including hand-wrapped and machine-wrapped food products such as meats, fish, poultry, and fruit. Although polyvinyl chloride films have a number of the properties set forth above, such films have not been entirely satisfactory in that, for example, the plasticizers required as a practical matter to impart flexibility, extensibility, and other properties often required by users gives rise to great difficulties in printing the films. In addition, ever-increasing restraints imposed by governmental authorities have resulted in stringent regulations on manufacturing, use and sale of polyvinyl chloride from the standpoint of permissible levels of vinyl chloride monomer.

Stretchable films of copolymers of ethylene and vinyl acetate are also known. See, for example, U.S. Pat. No. 3,391,129 (Sparks), which states that ethylene-vinyl acetate copolymers including about 2 to about 20% by weight vinyl acetate will form films having a degree of stretch or elasticity for wrapping meat products. Derwent Belgian Patents Report, vol. V. no. 26, issued Aug. 6, 1974, at Class A: Polymers — p. 1, in an abstract of Belgian patent publication 808,488, discloses a self-adhesive, transparent packaging film having high elasticity made from a mixture of (I) 90 – 99.95 weight % copolymer of more than 89 weight percent ethylene and a vinyl ester of a monocarboxylic acid and (II) 0.05 – 10 weight % hydrocarbon resin and/or 0.05 – 5 weight % liquid polybutylene. The Belgian patent publication discloses that the vinyl ester can be vinyl acetate and the hydrocarbon resin can be polyterpene resin, coumarone-indene resin, or polycyclopentadiene. However, known ethylene-vinyl acetate copolymer films have not been entirely satisfactory for stretchable film packaging applications for reasons including excessive tack, unsatisfactory slip, narrow heat seal temperature range, and difficulties encountered in attempts to use the film for machine packaging application.

An extensible elastic film of rubber hydrochloride (Pliofilm) and stretch wrapping therewith are disclosed in U.S. Pat. Nos. 2,168,651 (McCoy) and 2,301,106 (Brown).

Stretchable low density polyethylene has been suggested for packaging devices. See U.S. Pat. No. 3,837,478 (Cunningham et al), which discloses a multipack carrying device comprising a flattened tube made from stretchable and elastic plastic material, preferably low density polyethylene, which is described as having elastomeric characteristics.

U.S. Pat. No. 3,833,142 (Owens et al.) discloses a method of sealing the neck of a bottle or like container with a 1–10 mil thick film of flexible plastic which is capable of stretching, i.e. accomodating deflection which results from small differential pressure of 1 p.s.i. or more, without rupturing. Film materials described therein as suitable in the neck-sealing method include polyesters; copolymers of ethylene and propylene with one another and with vinyl acetate; low density polyethylene; ionomers; etc.

Films of selected ionic hydrocarbon polymers are disclosed by Rees in U.S. Pat. No. 3,264,272, which issued in 1966, and Canadian Pat. No. 674,595, which issued to the Du Pont Company in 1963. The ionic hydrocarbon polymers or ionomers disclosed in those patents are prepared by directly copolymerizing $C_2$ to $C_8$ alpha-olefins with $C_3$ to $C_{10}$ alpha, beta-ethylenically unsaturated mono- or dicarboxylic acids followed by neutralizing 10 to 90 percent of the acid groups with metal-containing cross-linking agents. Film-forming metal-containing ethylenic copolymers may be prepared by saponifying a primary copolymer of ethylene and an ester of an $\alpha,\beta$-ethylenically unsaturated carboxylic acid having 4 to 10 carbon atoms, as disclosed by Iwami et al., U.S. Pat. No. 3,789,035.

British Pat. No. 1,264,196, filed by the Du Pont Co. in 1969, discloses an extensible three-ply laminar structure of an inner layer of an elastomeric polymer and two outer layers of polymeric resin wherein the materials of the inner layer must have an extensibility of above about 400%, the outer layers each must have an extensibility equal to at least 50% of the extensibility of the inner layer, that is, above about 200%, and at least one of the outer layers has a coefficient of friction of metal of less than 0.50 as determined by an undisclosed test method. The outer layers may be of ethylene vinyl acetate copolymers, ethylene copolymerized with alkyl acrylic esters having 1–5 carbon atoms in the alkyl groups, or ethylene and propylene copolymers. Although it is disclosed generally that materials which can be used for the inner layer are elastomers which have an extensibility of greater than 400%, including natural and synthetic rubbers, the only embodiment disclosed includes two outer layers of an ethylenevinyl acetate copolymer including 28% vinyl acetate and a core layer of styrene-butadiene rubber.

Composite laminar structures including ionomeric coatings, layers, and adhesive compositions have been disclosed in the patent literature. Rees, in U.S. Pat. No. 3,355,319 issued in 1967, discloses a two-ply structure including a heat-sealable ionomeric coating on an organic thermoplastic polymeric material, which may be as-cast polypropylene or biaxially oriented polypropylene as set forth in Examples 12 and 14 thereof. U.S. Patent 3,764,458 (Ziegel) discloses a laminated structure consisting essentially of an ionomeric adhesive layer, about at least 3 to 20 mils in thickness, interposed between a substrate, e.g. a metallic automobile bumper, and a cured or uncured elastomeric copolymer of at least one $C_2$ to $C_8$ $\alpha$-olefin. The laminate is formed by interposing the ionomeric adhesive composition between the elastomeric copolymer and substrate layers and bonding the layers at a minimum temperature of about 140° C. and superatmospheric pressure of at least about 10–2000 p.s.i.g. Quackenbush in U.S. Pat. No. 3,552,638 discloses a plastic container having panels consisting of a laminate of a low-density polyethylene layer having relatively poorly adhered thereto a layer of a particular ionomer identified as a commercially available ionic crosslinked ethyleneacrylic copolymer containing metallic ions from groups 1 and 2 of the periodic table. According to the patent, the poorly adhered laminate may be formed by "dual extrusion in a typical laminating die." U.S. Pat. No. 3,338,739 to Rees discloses an ionic copolymer film having a coating of a vinylidene chloride copolymer, which is applied from a dispersion thereof followed by drying. Also disclosed therein is a stretched 1-mil thick film formed of an ionically cross-linked ethylene/methacrylic acid copolymer and having elongations of 61.4% and 50.9% in the machine and transverse directions. Bhuta et al. in U.S. Pat. Nos. 3,697,368 and 3,836,620 disclose preparation of a laminate by coextrusion through a flat film die onto a cooling roll of a polyethylene layer, an ionomeric inner layer such as ethylene-methacrylic acid-metal methacrylate copolymer and a nylon outer layer. U.S. Patent No. 3,775,239 (Snow) discloses a three-layer packaging sheet material consisting essentially of an extruded thin layer of a thermoplastic ionomer resin disposed between a paper substrate and a layer of polyethylene. Goehring et al. in U.S. Pat. No. 3,791,915 disclose coextrusion through "blown," "cast," "tube," or rod dies to prepare a three-layered laminate film having a nylon layer bonded by a 35 to 78 percent neutralized zinc ionomer adhesive layer to a layer of a blend of polyethylene and the ionomer.

U.S. Pat. No. 3,423,321 (Lutzmann) discloses coextrusion of a three-ply composite film including a nylon film having a thin coating of an ethylene acrylic acid copolymer and a film of a polyolefinic polymer affixed to the acid copolyer bonding layer.

Numerous other composite laminar structures are known. U.S. Pat. No. 3,793,476 to Misiura et al. discloses a composite of polymeric materials which includes a body of ethylene polymer adjoined to a body of an elastomeric blend of polymers including ethylene-propylene rubber admixed with a chlorine-containing rubber. U.S. Pat. No. 3,817,821 (Gallini) discloses a laminar packaging film including a high-density polyethylene core layer bonded to two thin outer layers of blends including ethylene-vinyl acetate copolymer components. Gallini discloses that the film may be prepared using a coextrusion process particularly where an outer layer has a low thickness of about 0.2 mil. Souffie in U.S. Pat. No. 3,449,204 discloses an uncured assembly obtained by joining an elastomeric curable $\alpha$-olefin hydrocarbon copolymer article to another elastomeric article employing a coating dispersion of a particular curable $\alpha$-olefin hydrocarbon polymer which may include non-conjugated diene units. Eustice in U.S. Pat. No. 3,658,635 discloses vibration damped structures including a high modulus base, a constraining sheet, and a stiff interlayer of a limited visco-elastic polymer dispersed in an acidic copolymer, e.g. ethylene/methacrylic acid neutralized from 0 to 50 percent by metal ions.

Tensile secant modulus, that is modulus of elasticity in tension at low elongation, is a property which has received attention from various film workers since at least as early as 1958. In U.S. Pat. No. 2,953,541 Pecha et al. disclose polyethylene compositions containing a copolymer of ethylene and ethyl acrylate which are described as suitable for use in the manufacture of shaped articles such as flat films. The latter patent teaches that shaped articles produced from a composition having a one percent secant modulus less than about 15,000 p.s.i. are generally too flexible for any practical use. As defined therein, one percent secant modulus is the modulus of elasticity in tension calculated from the stress/strain ratio at one percent elongation. More recently, Britton et al. in U.S. Pat. No. 3,682,767 disclose a film for liquid packaging having a useful range of secant modulus at 1% strain of 16-=K p.s.i., a coefficient of kinetic friction of 0.1 to 0.3, a melt index of 0.2 to 1.0, and consisting essentially of a blend of (a) 90–50% of a limited random copolymer of ethylene and 2 to 10 weight percent of an olefinic unsaturated monomer from the group consisting of vinyl acetate, methacrylic acid, styrene, etc., the random copolymer having a melt index of about 0.2 to 1.0, and (b) 10–50% of a limited linear copolymer of ethylene and an $\alpha$-olefin monomer of 3–20 carbon atoms such as propylene etc., the linear copolymer having a density of 0.93 to 0.96. A comparative film (Sample C of Examples 3–5 and Table II of the U.S. Pat. No. 3,682,767) made of a blend of (a) 95 percent of a random copolymer of ethylene and 7.5 percent vinyl acetate and (b) 5 percent of linear copolymer component and having a secant modulus of elasticity of 15–16K p.s.i. is characterized therein as too limp and completely unable to track through a packaging machine. It is generally disclosed therein that laminates can be prepared by conventionally bonding the films to films prepared form polyamides, polyolefins, polyesters and cellulose.

Other polymer blends including ethylene-vinyl acetate copolymers or ethylene-propylene copolymers with other polymers are known. U.S. Pat. No. 3,555,110 (McConnell et al.) discloses blends of 2-period sequential alpha-monoolefin block copolymers such as block copolymers of polyethylene and 50% to about 90% polypropylene with alkenyl carboxylate copolymers, e.g. a blend of a block propylene/ethylene copolymer containing 10% by weight ethylene and an ethylene/vinyl acetate copolymer containing 20% by weight vinyl acetate. Adhesive compositions containing a styrene-isobutylene copolymer and a copolymer of ethylene and vinyl acetate are disclosed by Shenfeld et al. in U.S. Pat. No. 3,644,252. It has also been disclosed generally that Kraton (trademark of Shell Oil Co.) styrene-butadiene block copolymers can be blended with ozone-resistant thermoplastics, e.g. ethylene vinyl acetate copolymers, as stated in Modern Plastics Encyclopedia, 1970–1971 issue, pages 217–218.

Blends of homopolymers of $\alpha$-olefins with ethylene-propylene copolymers and blends of ethylene homopolymers with elastomers are known. Martinovich in U.S. Pat. No. 3,250,825 discloses a blend of high-density highly crystalline polyethylene with ethylene-propylene copolymer. U.S. Pat. No. 3,036,987 to Ranalli discloses blends of isotactic polypropylene with a linear, regular head-to-tail, substantially amorphous copolymer of propylene and ethylene containing 30% to 70% by weight of ethylene. U.S. Pat. No. 3,639,189 (Hartman) discloses adhesive compositions containing a polyethylene melt blended with an oxidized linear polyethylene and optionally an elastomer.

Processes and apparatus for coextrusion are well known. See, for example, U.S. Pat. No. 3,223,761 (Raley), which discloses a method and apparatus for hot blown coextrusion described therein as capable of producing multi-wall tubular film, and U.S. Pat. No. 3,480,998 (von Erdberg), which discloses an extrusion hopper for making thin composite films.

Numerous additives are known agents for improving or imparting slip, blocking, and anti-fogging properties to polymeric films. Foster in U.S. Pat. No. 3,595,827 teaches that a combination of particular amphipathic N-substituted amides such as N-stearyl erucamide and silica improves slip and blocking properties of inorganic salts of ethyleneacrylic or methacrylic acid interpolymers (ionomers). Also disclosed therein is production of thin films of sodium salts of ethylene-acrylic acid interpolymers by means of a blown film line employing an extruder and an Egan-type tubular die. U.S. Pat. No. 3,734,878 (von Dohlen) discloses ionomeric compositions including ethylene/acrylic or methacrylic acid copolymers neutralized with sodium compounds and N,N'-di-n-($C_1$-$C_{24}$) alkyl terephthalamide which are therein characterized with anti-blocking and slip properties. Eastes in U.S. Pat. No. 3,541,040, granted to W. R. Grace & Co., discloses polymers of olefins having good slip, anti-block and anti-fog properties including, in a preferred embodiment, ethoxylated lauryl alcohol, glyceryl monostearate, sodium dioctyl sulfosuccinate, erucamide, and finely divided silica gel.

As will be apparent to those skilled in the art, not all copolymer compositions prepared from elastomeric copolymer-forming monomers are elastomeric. Thus, ethylene-vinyl acetate copolymers, which may be prepared using, for example, the processes disclosed by Perrin et al. in U.S. Pat. No. 2,200,429 and Roedel in U.S. Pat. No. 2,703,794, may be converted to elastomers using high dosage irradiation as stated by Tubbs in U.S. Pat. No. 3,734,843 with citation of U.S. Pat. No. 3,160,575 (Bartl et al.) and Canadian Pat. No. 647,190 (Leeper). Effects on permeability characteristics of polymeric films formed of ethylenevinyl acetate and ionomeric polymers using low energy electron beams are described by Osterholtz in U.S. Pat. No. 3,846,521.

A number of workers have confronted problems in attempts to bond elastomers comprising ethylene-propylene copolymers to various flexible substrates. See, for example, Brams et al., U.S. Pat. No. 3,445,318.

Thin film manufacture is recognized in the art as a particular and complex field. See, for example, U.S. Pat. No. 3,515,775 (Combs et al.). The complexity is magnified when thin films must meet the stringent requirements of stretchable wrap packaging machinery such as, for example, the wrapping machines disclosed by Crescenzo in U.S. Pat. No. 2,675,658 which tighten a wrapper under tension around an article being packaged and the especially troublesome requirements of stretch-wrap machines of the type described by Fabbri in U.S. Pat. No. 3,662,513 and the type commercially available from Weldotron Corporation as highspeed Automac film packaging machines. The Automac Model A-44 and A-44P packaging machines, for example, are rated by Weldotron as capable of stretch wrapping tray-supported articles in stretchable film overwraps at speeds up to a maximum of 50 packages per minute. The rated maximum package size, in inches, is about 12×8×6. (See also Modern Packaging Encyclopedia and Planning Guide, December 1974, p. 146.) In the above-cited 3,662,513 patent, which is incorporated herein by reference, Fabbri discloses a machine for carrying out a process for the packaging of items in stretch films, i.e. foils of stretchable plastic material, which includes severing a foil sheet from a continuous foil web; placing a foil sheet under tension below a folding matrix plate having a passage opening therethrough corresponding to the item to be packaged; elevating the item vertically through the opening while simultaneously holding fast at least two opposed edges of the foil sheet, the sheet thereby being stretched and drawn over the item to be packaged while forming a bag-like wrapper; folding the edges of the foil sheet under the item; pressing said edges against the external base of said item; and pushing the packaged item off the folding matrix plate parallel to the surface of the latter. In an aspect of the Fabbri process the sheet is severed by perforating an unreeled foil web and tearing off the sheet along the perforation by forcibly moving it. In addition to a folding matrix plate, lifting platform and gripping mechanism, the Fabbri machine includes a pair of drawing rollers for unreeling a stretch film supplied as a roll of foil web, a conveying path consisting of upper and lower pairs of endless belts which remain in engagement with each other and extend closely under the folding matrix plate, and a perforating device disposed intermediate the drawing rollers and the conveying path intake for perforating the unreeled stretch film. In operation, the belts are driven at a higher speed than the speed of the rollers such that the leading portion of the foil web is pulled in a lightly stretched and smoothly spread state into the conveying path to tear a sheet from the web along the perforation.

In operation of the Weldotron Automac Model A-44 machines, a product, which may be one or more items disposed on a semi-rigid tray, is advanced into a wrapping station by movement of chain-driven pushers. Sheeted stretch film is advanced by polyester belts into gripper-jaws located above the wrapping station. The product is then lifted into the film by means of an elevator which simultaneously produces omni-directional stretching of the film about the product. Cam-operated tuckers then fold the film about the bottom of the product in an overlapped fashion. The package being formed is thereafter pushed from the wrapping station which, when the film is of almost any of a wide variety of heretofore known materials, frequently results in adhesion of film tails or residue to the tuckers or otherwise fouling the packaging operation. The package is then completed by passage over a hot belt which seals the bottom overlapped film.

Other problems encountered using heretofore known films on packaging machines of the Automac Model A-44 type include inability of the films to stretch at sufficient rates for high speed packaging; film rupture; crazing of the films when stretched; film feed problems including slipping on the belts, adhering to the belts, inadequate film perforation, and incomplete film sheet severance from the webs; poor balance of film properties in the machine and transverse directions; inability to seal the film with minimum skill and without great difficulty; and distortion of the product being overwrapped.

Although films of polyvinyl chloride having stabilizing and plasticizing agents necessarily incorporated therein have been used for many years in several extensible film applications, including use on Automac wrapping machines where a high degree of success has been achieved from several standpoints, such films have not been entirely satisfactory for several reasons. Drawbacks include the time and effort required to incorporate plasticizing agents and resulting high cost, the asserted harmful effect on human health of even minor amounts of vinyl chloride monomer residue which may be released from the film, and the still higher cost resulting from the costly measures which have been implemented in attempts to reduce vinyl chloride monomer content in the film in order to preserve the substantial vinyl chloride polymer film industry. Rubbery products including films of polyvinyl chloride-phosphate plasticizer compositions have been known since at least as early as 1940. See Semon, U.S. Pat. No. 2,188,396. The level of consumption and exports of vinyl chloride polymers has been reported at over 2 billion pounds in 1967 and over 3 billion pounds in 1970 for the United States alone, including nearly 500 million pounds as film or sheeting in 1967 and over 600 million pounds as film or sheeting in 1970. (See Encyclopedia of Polymer Science and Technology, vol. 14, page 310, Interscience Publishers, London, New York, Sydney and Toronto, 1971.) Suspected health problems associated with polyvinyl chloride have been known for over 20 years, as shown, for example, by Russian reports in 1949 relating to disease of the liver. Following deaths in 1960 attributed to acute toxicity in Canada, the American Conference of Governmental Industrial Hygienists in 1963 established a threshold limit value for vinyl chloride. In 1967 investigators at the University of Michigan found 25 cases of osteomyelitis in polyvinyl chloride workers which some analysts attributed to exposure to vinyl chloride.

Thus there have been long-felt needs in the art for an extensible film which can be used for applications where polyvinyl chloride films have been employed, such as, for example, film packaging, without requiring plasticizers and vinyl chloride and without sacrifice of film quality. Prior to the present invention these long-felt needs have continued, notwithstanding attempts of others to recognize and eliminate the problems.

It has now been found that by practice of the present invention many of the prior art deficiencies are overcome and long-felt needs are fulfilled in simple, efficient and economical manner without detracting from the effective utility thereof.

SUMMARY OF THE INVENTION

Generally stated, in an aspect of this invention there is provided a new improved extensible composite laminar film comprising a first layer of elastomeric polymeric composition and an extensible sealable layer of a polymeric composition comprising an interpolymer of ethylene and alkenoic acid which may be an ethylenically unsaturated carboxylic acid having from 3 to about 10 carbon atoms. The composite extensible film may further include and preferably does include a second sealable layer of a polymeric composition comprising an interpolymer of ethylene and alkenoic acid which may be an ethylenically unsaturated carboxylic acid having from 3 to about 10 carbon atoms with the first layer disposed intermediate the first and second sealable layers. In a preferred embodiment packaging performance is improved by using stretch films of the present invention having a tensile secant modulus of from, for example, about 1,000 p.s.i. up to about 30,000 p.s.i (pounds per square inch).

Surprisingly, excellent packaging performance may be observed for stretchable films of this invention having a tensile secant modulus of less than about 15,000 p.s.i. Films of the present invention characterized with tensile secant modulus values within the above ranges may be prepared of layer combinations which persons having ordinary skill in the art would not expect to be so characterized.

Interpolymers of ethylene and alkenoic acids generally preferred herein are ionomers, that is inorganic salts of ethylenealkenoic acid interpolymers wherein the acid groups are neutralized in whole or in part with inorganic cations. As used herein, "interpolymers of ethylene and alkenoic acid," "interpolymers of ethylene and ethylenically unsaturated carboxylic acid," and terms of similar import include ethylene-alkenoic acid interpolymers per se and inorganic salts thereof wherein the acid groups are neutralized in whole or in part. Unlike many heretofore known films formed of, for example, polyvinyl chloride, the present film does not require plasticizers.

In another aspect, the present invention provides a process for stretch wrapping which, generally stated, includes stretching the present film about a product so that portions of the film overlap one another and sealing the overlapping film portions. Products may be effectively stretch wrapped at low, intermediate and high speeds using the present film, while at the same time resulting typically in tough, durable, high-quality packages having high aesthetic appeal. In use the present film provides improvements in many heretofore known stretch film packaging processes, including especially the type disclosed in above cited U.S. Pat. No. 3,662,110.

In another aspect of this invention there is provided a new improved elastomeric film-forming composition which in various embodiments thereof is highly effective for preparing an elastomeric layer of the present composite film. The film-forming composition is a blend, preferably an extrudable blend, including (I) about 1 to about 99 and preferably about 5 to about 95 percent by weight of a preferably elastomeric interpolymer of ethylene and about 2 to about 30 and preferably about 3 to about 12 weight percent of vinyl acetate units and (II) about 99 to about 1 and preferably about 95 to about 5 percent by weight of a preferably elastomeric interpolymer of ethylene and propylene, the propylene-containing interpolymer desirably having a density of not more than about 0.92 and preferably about 0.84 to about 0.88 gram per cubic centimeter and desirably containing ethylene units in an amount from about 20 to about 75 and preferably from about 60 to about 75 weight percent. Preferably at least one of the interpolymer components is elastomeric.

In general, the blend is preferably formulated to have a tensile secant modulus, when formed into a thin self-supporting film or film layer having thickness of, for example, from about 0.5 to about 3 mils, of not more than 15,000 p.s.i., for example from about 1,000 p.s.i. to about 14,900 p.s.i. and preferably from about 1,000 p.s.i. to about 9,000 p.s.i. Films formed using blends thus formulated typically have excellent limp properties for packaging applications and typically are eminently suitable for packaging using packaging machines through which the film tracks in operation.

The present invention also provides a highly effective process for preparing extensible composite laminar films. Generally stated, the present process includes coextruding a first melt of an elastomeric polymeric composition and a second melt of a polymeric composition comprising an interpolymer of ethylene and alkenoic acid, wherein the interpolymer is preferably an ionomer, and hot blowing the resulting incipient composite film so that preferably not more than a minimal degree of film orientation is effected. Hot blown coextruded films prepared by the process are eminently suitable for stretch-wrap applications, including hand-wrapping and high-speed machine wrapping. Advantages of the present process include capability of thus preparing high-quality stretchable composite films using polymeric compositions within a wide range of melt properties. Thus, for example, elastomeric polymeric compositions having such poor melt properties that blown-extrusion films thereof ordinarily can not be prepared without great difficulty may be effectively extrusion composited with interpolymers of ethylene and alkenoic acid having suitable melt properties to form blown extensible composite films in simple efficient manner.

Generally stated, the package of the present invention includes a product, which may include a tray or the like and one or more articles disposed thereon, and an overwrap of the present extensible composite film in stretched condition about the product. Typically, packages of the present invention are characterized with high elastic recovery of the overwrap upon removal of deforming forces which often result from hand gripping the packages.

Practice of the present invention will be made more apparent by the following detailed description including the examples which form a part thereof.

DETAILED DESCRIPTION

The present extensible composite laminar film is often referred to herein for simplicity as stretch film. In practice, many packagers and packaging machines require stretch films which can be stretched or extended substantial amounts, for example up to 300 and often up to 500 or more percent elongation, often in as little time as one second and lower, without rupture and without requiring use of hopefully avoidable high stretching forces. In many applications, the present stretch film fulfills these stringent requirements, especially when prepared such that the tensile secant modulus of the film is from about 1,000 to about 30,000 and preferably from about 1,000 to about 14,950 p.s.i. (pounds per square inch). Eminently suitable performance in high-speed packaging, for example 40 or more packages per minute, on an Automac A-44P stretch-wrap machine can be provided using films of the present invention having a tensile secant modulus within the above ranges and especially from about 6,000 to about 14,950 p.s.i.

Polymeric compositions useful in extensible sealable layers of the present stretch films include acidic interpolymers of ethylene and one or more alkenoic acids, the interpolymers being substantially free of neutralized acid, wherein the alkenoic acids are preferably alpha, beta-ethylenically unsaturated carboxylic acids having from 3 to about 10 carbon atoms per molecule of the acid. Ethylene-$\alpha,\beta$-ethylenically unsaturated carboxylic acid interpolymers suitable in this invention include ethylene-acrylic acid copolymers, ethylene-methacrylic acid copolymers, ethylene-itaconic acid copolymers, ethylene-methyl hydrogen maleate copolymers, ethylene-maleic acid copolymers, ethylene-acrylic acid-methyl methacrylate copolymers, ethylene-methacrylic acid-ethyl acrylate copolymers, ethylene-itaconic acid-methyl methacrylate copolymers, ethylene-methyl hydrogen maleate-ethyl acrylate copolymers, ethylene-methacrylic acid-vinyl acetate copolymers, ethylene-acrylic acid-vinyl alcohol copolymers, ethylene-propylene-acrylic acid copolymers, ethylene-styrene-acrylic acid copolymers, ethylene-methacrylic acid-acrylonitrile copolymers, ethylene-fumaric acid-vinyl methyl ether copolymers, ethylene-vinyl chloride-acrylic acid copolymers, ethylene-vinylidene chloride-acrylic acid copolymers, ethylene-vinyl fluoride-methacrylic acid copolymers, and ethylene-chlorotrifluoroethylene-methacrylic acid copolymers. These interpolymers, many of which are commercially available, are well known in the art and may be prepared by known methods described, for example, by Graham et al. in U.S. Pat. No. 3,132,120 and Thomson et al. in U.S. Pat. No. 3,520,861. Ethylenemethacrylic acid interpolymers and ethylene-acrylic acid interpolymers are generally preferred herein. The acid moiety of the acid interpolymer may be present in any suitable amount, desirably from about 2 to about 40 percent and preferably from about 5 to about 25 percent, especially about 5 to about 20 percent, based on the weight of the interpolymer. Suitable ethylene acidic interpolymers include Dow PZ 4333-9 (a copolymer of ethylene and 9 percent acrylic acid) and Dow XP 2375-12 (a copolymer of ethylene and 8 percent acrylic acid) by The Dow Chemical Company.

Other ethylene-carboxylic acid interpolymers suitable in the extensible sealable layers include ionic copolymers which may be prepared, for example, by ionically cross-linking direct or indirect copolymers of ethylene and alpha, beta-ethylenically unsaturated carboxylic acids. Ionic copolymers or ionomers and methods for preparation thereof are well known, as disclosed for example by Rees in above-cited U.S. Pat. No. 3,264,272 and by Iwami et al. in U.S. Pat. No. 3,789,035. Those two patents are incorporated herein in pertinent part by reference. Ionic copolymers useful herein include ionomers prepared from direct and indirect copolymers of ethylene, preferably in an amount of at least 50 mol percent based upon the copolymer, and an alpha, beta-ethylenically unsaturated monocarboxylic acid, the acid monomer or acidified acid derivative monomer content of said copolymer being from 5 to 25 mol percent based upon the copolymer, the copolymer having a melt index between about 0.5 and about 40 and containing uniformly distributed throughout a metal ion having an ionized valence of 1 to 3 inclusive, wherein preferably at least 10 percent of the carboxy groups of the acid are neutralized by the metal ion and exist in an ionic state.

Generally preferred ionomers in the present invention are inorganic salts of ethylene-acrylic or ethylene-methacrylic acid interpolymers containing acrylic acid or methacrylic acid interpolymerized therein in an amount from about 2 to about 25 percent by weight, preferably about 3 to about 20 weight percent, and especially about 8 to about 18 weight percent.

The inorganic salts of these carboxyl-containing interpolymers may have about 10 to 100 percent by weight of the acrylic acid or methacrylic acid moieties converted or neutralized to acrylate or methacrylate salt moieties containing alkali metal, alkaline earth metal or zinc cations. Examples of alkali metal interpolymer salts are those containing sodium, potassium, or lithium cations. Exemplary of alkaline earth metal interpolymer salts are those containing calcium, barium, strontium and like cations.

These interpolymer salts may be prepared, for example, by reacting ethylene-acrylic acid or methacrylic acid interpolymers with metal salts such as carbonates or bicarbonates; metal bases such as hydroxides or alkoxides; metal alkyls such as sodium ethyl, butyl lithium, and the like; metal aryls such as phenyl lithium, potassium naphthalene, and the like; hydrides of sodium, potassium and the like; oxides such as sodium peroxide, barium peroxide, zinc oxide, and the like; or in the case of alkali metal salts even with a free alkali metal itself.

The ethylene-acrylic acid interpolymers used in this invention may be made, for example, by the free radical, random interpolymerization of ethylene with either acrylic or methacrylic acids using methods well known in the art including bulk, solution, aqueous suspension, non-aqueous dispersion and emulsion techniques in either batch or continuous processes.

Ionomer salts of ethylene-methacrylic acid copolymers neutralized, preferably with zinc ions, to an extent of less than 35 percent of the acid groups, for example, from about 10 to about 30 percent and preferably from about 15 to about 25 percent, are found especially suitable for forming sealable layers of the present multilayer films. Goehring et al. in above-cited U.S. Pat. No. 3,791,915 describe ionic copolymers as quite selective as to the substrate materials to which they will adhere and clearly indicate that ionomers having less than 35 percent or more than 78 percent of the carboxylic acid groups neutralized by zinc ions do not adhere well to other materials.

Unexpectedly, it is found that sealable layers comprising ionomers having less than 35 percent of the carboxy (HOOC-) groups neutralized with zinc adhere well to the layers comprising elastomeric polymeric composition in the present stretch films. It is especially surprising that in the present stretch films the lowly neutralized ionomers adhere well even to elastomeric compositions comprising copolymers of ethylene with propylene, which typically have been limited in use by bonding problems as indicated by Brams et al. in above-cited U.S. Pat. No. 3,445,318.

Ionomers preferred in the sealable layers of the present stretch films are copolymers of ethylene and from about 5 to about 20, preferably about 14 to about 16 weight percent methacrylic acid which are neutralized with zinc or sodium to an extent of from about 10 to about 45 percent, preferably from about 10 to about 30 percent and especially about 20 to about 25 percent of the stoichiometric amount of zinc or sodium required to neutralize all the methacrylic acid groups of the copolymer; having a melt index of about 1 to about 20, preferably about 5 to about 20 and especially about 12 to about 16 grams per 10 minutes. These ionomers may have a tensile strength of from about 3,000 to about 5,000 p.s.i. and preferably from about 3,500 to about 5,000 p.s.i. and an elongation at rupture of at least about 300 percent and preferably at least 400 percent, as determined by ASTM test method D-1708 using a ⅛-inch thick sample and a crosshead speed of 0.5 inch per minute; and a flexural secant modulus (i.e. in bending) of less than about 40,000 p.s.i., preferably less than about 30,000 p.s.i. and especially about 10,000 to about 25,000 p.s.i., as determined by ASTM test method D-790-A using a ¼-inch by ½-inch by 5-inch beam sample, a span of 4 inches, and a test speed of about 0.11 inch per minute. These ionomers are referred to herein as ionomers of Class A.

A highly suitable ionomer generally preferred herein is a copolymer of ethylene and about 14 to about 16 (e.g. 15) weight percent methacrylic acid which is about 20 to 25 (e.g. 22) percent neutralized with zinc, and having a melt index of about 12 to about 16 (e.g. 14) grams per 10 minutes. This ionomer may have an elongation at rupture of about 440 percent, a tensile strength of about 3,600 p.s.i., and a flexural secant modulus of about 22,010 p.s.i., wherein the physical properties are measured using the test methods identified above for ionomers of Class A. This ionomer is referred to herein as Ionomer A-1.

Another highly suitable ionomer generally preferred herein is a copolymer of ethylene and about 11 to about 13 (e.g. 12) weight percent methacrylic acid which is about 32 to 42 (e.g. about 40) percent neutralized with zinc, and having a melt index of about 1 to 2 (e.g. 1.5). This ionomer may have an elongation at rupture of about 490 percent, a tensile strength of about 3,900 p.s.i., and a flexural secant modulus of about 25,240 p.s.i., wherein the physical properties are measured using the test methods identified above for ionomers of Class A. This ionomer is referred to herein as Ionomer A-2. Ionomers A-1 and A-2 are highly effective in sealable layers of films of the present invention even when prepared as thin films (e.g. about 1 mil or lower in thickness), especially when high stretch rates are required as in high-speed packaging on Automac A-44 type machines.

Still another ionomer which is suitable herein is a copolymer of ethylene and about 8 to about 10 (e.g. 9) weight percent methacrylic acid which is about 20 to about 25 (e.g. about 23) percent neutralized with zinc, and having a melt flow index of about 4 to about 6 (e.g. 5) grams per 10 minutes. This polymer may have an elongation at rupture of about 470 percent, a tensile strength of about 3,000 p.s.i., and a flexural secant modulus of about 22,910 p.s.i., wherein the physical properties are measured using the test methods identified above for ionomers of Class A. This ionomer is referred to herein as Ionomer A-3.

Still another ionomer suitable in some of the present films is an ionic copolymer prepared from a base copolymer of ethylene and about 10 to about 12 (e.g. 11) weight percent methacrylic acid having a melt index prior to neutralization of about 100 grams per 10 minutes and neutralized with sodium to an extent such that the melt index of the ionomer is about 8 to about 12 (e.g. 10) grams per 10 minutes. This polymer may have an elongation at rupture of about 390 percent, a tensile strength of about 3,000 p.s.i., and a flexural secant modulus of about 35,630 p.s.i., wherein the physical properties are measured using the test methods identified above for ionomers of Class A. This ionomer is referred to herein as Ionomer A-4.

In a preferred embodiment of this invention the present composite extensible film is formed by coextrusion of Ionomer A-1 and a preferred embodiment of the present film-forming elastomeric composition such that the resulting composite film (hereinafter referred to as Film I) is an A-B-A construction wherein B represents a core layer of the embodiment elastomeric composition and each A represents an outer layer of Ionomer A-1. Each A layer of Film I may be from about 0.05 mil to about 0.3 mil, for example, about 0.15 mil in thickness and the B layer may be from about 0.4 mil to about 0.8 mil, for example, about 0.70 mil in thickness. A 1.1-mil hot blown A-B-A film (sometimes referred to hereinafter as Film I-a) was prepared by coextrusion as set forth in Example 44 (part E) below such that the ratio of the thickness of the B layer (about 0.77 mil) of the indicated elastomeric composition to the thickness of each A layer (about 0.17 mil) of Ionomer A-1 was about 4.7 to 1. Samples of Film I-a were found to have tensile secant moduli of 11,400 p.s.i. in the machine direction (MD) and 10,900 p.s.i. in the transverse direction (TD). Surprisingly, each of the MD and TD tensile secant moduli of composite Film I-a of the present invention are lower than the tensile secant modulus in the corresponding direction of separately prepared blown films corresponding to the component layers of Ionomer A-1 and the elastomeric composition, as shown in greater detail in Example 44 below. Moreover, coextruded Film I-a was lower in tensile secant moduli than a pressure laminated A-B-A film prepared by laminating two portions of the pre-formed blown film of Ionomer A-1 to opposite surfaces of the pre-formed blown film of the elastomeric composition. Films of the present invention having lower tensile secant moduli, of which Film I-a is an example, typically are found to consistently perform better in high speed machine packaging applications, including use on machines of the Automac A-44 type which require high rates of stretching, e.g. about 200 to about 500 percent elongation of film per second.

The present stretch film is more versatile than prior art extensible film structures. For example, according to the description in British Pat. No. 1,264,196 the extensible film disclosed therein requires two outer layers each having an extensibility equal to at least 50% of the extensibility of the inner layer and is limited in the polymeric resins which can be used in the outer layers to resins having an extensibility of at least 50% of the inner layer, that is above about 200%. In contrast, the present stretch film is not so limited. Film I-a of the present invention may be formed, for example, of an inner layer of an elastomeric composition having an extensibility of 160 percent in the machine direction and an extensibility of 420 percent in the transverse direction as shown in Example 44 (part B) below and two outer layers of Ionomer A-1 having an extensibility of 30 percent in the machine direction and an extensibility of 100 percent in the transverse direction as shown in Example 44 (part A) below. The versatile stretch films of the present invention nevertheless are typically found to perform well, even under the exacting requirements of high-speed packaging on Automac A-44 type machines.

The layer of elastomeric polymeric composition included as a component of the present composite stretch film may be formed of any suitable elastomeric polymer, including elastomeric homopolymers and elastomeric copolymers of two or more copolymerizable moieties. The copolymers may be prepared, for example, by random, block or graft polymerization of elastomeric polymer forming monomers and/or prepolymers, and by converting non-elastomeric polymers to elastomers using known techniques therefor such as, for example, the irradiation procedure described in the above-cited Bartl et al. patent.

As used herein, the terms "elastomer," "elastomeric polymeric composition" and words of similar import refer to material which at room temperature can be stretched repeatedly to about 1.5 times its original length and, after release of the stress, will return relatively quickly, with or without force, to its approximate original length. In general, elastomeric polymeric compositions useful herein include polymeric compositions which, when formed into film are nonrigid to slightly semirigid plastics, that is plastics having initial (1 to 10 percent strain) tensile secant moduli of from about 500 or less p.s.i. up to about 40,000 or more p.s.i., and preferably not more than about 25,000 p.s.i., as calculated from stress-strain data developed by the procedure of ASTM D 882-67, Method A.

Elastomeric polymeric compositions suitable herein include compositions comprised of, in major amount, elastomeric interpolymers of ethylene with an α-monoolefin having from 3 to about 8 and preferably from 3 to about 5 carbon atoms per molecule, e.g. propylene, with or without other moieties which form therewith terpolymers, tetrapolymers, and the like; elastomeric interpolymers of styrene with conjugated dienes, e.g. butadiene and isoprene; elastomeric interpolymers of ethylene and a vinyl ester of a carboxylic acid having from 2 to about 5 and preferably from 2 to about 3 carbon atoms per molecule, e.g. elastomeric ethylene vinyl acetate copolymers; elastomeric polyurethanes, which may be prepared for example by reacting polyfunctional isocyantes such as tolylene diisocyanate, hexamethylene diisocyanate, and the like with compounds having reactive hydrogen functionality of at least 2 such as diols and higher polyols and/or diamines and higher amines to prepare elastomers containing urethane and/or urea linkages; elastomeric polyesters, which may be esters formed by reacting polyols with dicarboxylic acids or anhydrides thereof, e.g. elastomeric condensates of diols such as ethylene glycol and the like with terephthalic acid or phthalic anhydride; elastomeric polyethers; mixtures thereof; and the like.

Suitable elastomeric copolymers of ethylene with an α-olefin having 3 to about 8 carbon atoms (e.g. propylene), which may further include units of a non-conjugated diene (e.g. alkenyl or alkylidene norbornene, 1,4-hexadiene, etc.) and processes for preparation thereof are well known in the art as shown, for example, by U.S. Pat. Nos. 3,291,780 (Gladding et al.) and Reissue No. 28,206 (Gardner et al.). Particular ethylene-propylene.elastomers, prepared by a low pressure (preferably 60–150 p.s.i.g.) solvent-polymerization process, disclosed by the cited Gardner et al. patent include copolymers having an ethylene content from 48.6 to 60.1 percent by weight uncorrected for for approximate 10 percent error (too high) as disclosed therein, a number average molecular weight ($\overline{M}_n$) controlled by hydrogen addition from 66,700 to 154,000, and an inherent viscosity in Decalin at the temperature indicated from 2.9 (135° C) to 4.05 (temperature not given). The ethylene-propylene copolymer elastomers disclosed in the cited patent to Gladding et al. contain ethylene units in an amount by weight between about 20 to 75 percent (20 to 72.5 or 77.5 percent in the terpolymers further containing a non-conjugated diene, depending on the diene) in order that the copolymer be elastomeric. A suitable elastomeric or rubbery copolymer of ethylene and propylene is that of Examples 1 B and 18 of Gladding et al., which disclose a copolymer containing 55% propylene units and exhibiting an intrinsic viscosity (0.1% solution in tetrachloroethylene at 30° C.) of 4.28 to 5.12.

Representative examples of ethylene/propylene/ene-substituted norbornene elastomeric terpolymers suitable herein include ethylene/propylene/5-methylene-2-norbornene and ethylene/propylene/5-alkenyl-2-norbornene (e.g. 5-(2'-ethyl-2'-butenyl)-2-norbonene) including from 20 to 72.5 percent by weight ethylene units, from 25 to about 77.5 percent by weight propylene units, and up to 20 percent by weight norbornene diolefin monomer units. Other examples of these copolymers are set out in above-cited U.S. Pat. No. 3,291,780, which in pertinent part is incorporated herein by reference.

Ethylene-propylene elastomers of which the layer of elastomeric composition may be formed include propylene-ethylene polyallomers. These thermoplastic copolymers are well known in the art and are reviewed in 1972–1973 Modern Plastics Encyclopedia, vol. 49, no. 10A, October 1972 at page 64. Propylene-ethylene polyallomers are commercially available from Eastman Chemical Products, Inc., Kingsport, Tennessee.

Suitable styrene-butadiene elastomers and processes by which these copolymers can be prepared are also well known in the art. See, for example, U.S. Pat. No. 3,265,765 (Holden et al.), which is incorporated herein by reference and discloses elastomeric block copolymers having two end blocks of a non-elastomeric polymer, e.g. polystyrene, and an inner elastomeric polymer block of a polymerized conjugated diene, e.g. polyisoprene. Elastomeric block copolymers of styrene and butadiene and preparation methods therefor are described by Orr et al. in Journal of the American Chemical Society, vol. 79, June 20, 1957, page 3137 et seq. Interestingly, as disclosed by Holden et al., ethylene-propylene copolymers containing up to 80–95 mol percent ethylene units are non-elastomeric, whereas structurally similar ethylene-propylene copolymers containing up to 60–70 mol percent ethylene units may be elastomeric. Elastomeric styrene-diene interpolymers suitable for use herein include commerically available Kraton (trademark of Shell Oil Co.) thermoplastic elastomers. In general, these polymers are block copolymers including polystyrene end blocks and intermediately disposed elastomeric polybutadiene or polyisoprene blocks.

Suitable elastomeric polyurethane and preparation methods therefor are well known in the art as shown, for example, by U.S. Pat. No. 3,845,019 (Chadwick et al.). Film-forming polyurethanes and their preparation are disclosed by Wilson et al. in U.S. Pat. No. 3,842,042. Elastomeric polyurethanes are commercially available under the trademarks Estane of B. F. Goodrich Co. and Q-Thane of K. J. Quinn & Co., Malden, Massachusetts.

Suitable polyester elastomers are disclosed, for example, in U.S. Pat. No. 3,623,944 to Davis et al., which discloses elastomeric copolymers containing at least 50 percent, by weight, of an alkyl acrylate ester wherein the alkyl group contains from four to twelve carbon atoms, together with a hardening comonomer selected from the group consisting of vinyl acetate, methacrylate, ethyl methacrylate, etc. An example of such a polymer is a 1:1 copolymer of octyl acrylate with vinyl acetate. Acrylic ester elastomers and a method for their preparation are also disclosed in U.S. Pat. No. 3,830,878 (Kato et al.). Thermoplastic polyester elastomers suitable herein are commercially available under the trademark Hytrel of the DuPont Company. Hytrel polyester elastomers are generally amorphous terephthalate polymers which may be derived from terephthalic acid, polytetramethylene ether glycol, and 1,4-butanediol and are reviewed in 1974–1975 Modern Plastics Encyclopedia, vol 51, no. 10A, October 1974, at page 115. Other thermoplastic polyesters which may prove useful herein are generally amorphous 1,4-cyclohexylene dimethylene terephthalate/isophthalate copolymers, which may be obtained from Eastman Chemical Products under the designation PCDT and are reviewed at page 76 of the last-cited issue of Modern Plastics Encyclopedia.

Polyether elastomers suitable herein are also well known in the art. See U.S. Pat. No. 3,623,944 to Davis et al., which discloses elastomeric polymers of alkyl vinyl ethers such as, for example, polymethyl vinyl ether and polyethyl vinyl ether. Polyethers suitable herein include elastomeric polyvinyl methyl ether, elastomeric polyvinyl ethyl ether, elastomeric polyvinyl-n-butyl ether, elastomeric polyvinyl isobutyl ether, elastomeric polyvinyl tert.-butyl ether, and the like.

Also suitable herein are elastomeric polyesterurethanes including, for example, the elastomeric gums prepared by the method disclosed in U.S. Pat. No. 2,785,150 (Kreider et al.), which may be prepared using an organic diisocyanate in a chain-lengthening reaction step to prepare modified polyesterurethanes having substituted urea linkages. Film-forming thermoplastic polyester urethane elastomers and polyether urethane elastomers are available commercially under the trademark Estane of B. F. Goodrich Chemical Co.

Still other elastomeric polyesters which are suitable herein are extrudable rubber-like isocyanate-modified polyesters, which may be prepared by the method disclosed by Muller et al. in U.S. Pat. No. 2,729,618.

In general, thermoplastic elastomers are especially suitable for forming the present film layer of elastomeric polymeric composition using extrusion apparatus. Several thermoplastic elastomers or rubbers are reviewed in 1973–1974 Modern Plastics Encyclopedia, vol. 51, no. 10A, October 1974 at pages 114–116. Thermoplastic rubbers found suitable herein for some film applications include polyolefin thermoplastic rubbers which are commercially available from Uniroyal under its trademark TPR and reviewed in the last-cited issue of Modern Plastics Encyclopedia at page 116. Infrared spectra scans of TPR 1600, TPR 1900 and TPR 2800 indicate that these thermoplastic elastomers are ethylene-propylene interpolymers wherein ethylene units are present in amounts from about 40 to about 60 percent by weight and the propylene units are present principally as isotactic polypropylene.

Suitable elastomeric interpolymers of ethylene and a vinyl ester of a carboxylic acid having from 2 to about 5 carbon atoms per molecule include interpolymers of ethylene with vinyl acetate, vinyl propionate, vinyl butyrate, and vinyl valerate. Ethylene-vinyl propionate and especially ethylene-vinyl acetate elastomeric interpolymers are preferred. The vinyl ester moiety may comprise, for example, from about 1 to about 50 percent by weight of these ethyleneester interpolymers. Elastomeric ethylene-vinyl acetate interpolymers including from about 1 to about 40 and preferably from about 15 to about 30 percent by weight of vinyl acetate units are highly suitable for forming layers of elastomeric polymeric composition in the present composite film. In general, it is found that films having better optical clarity may be prepared using ethylene-vinyl acetate elastomers containing lower amounts of vinyl acetate units while films having improved elasticity may be prepared using ethylene-vinyl acetate elastomers including higher amounts of vinyl acetate units. When prepared using ethylene-vinyl acetate elastomers within the above ranges of vinyl acetate content the present films typically have suitably balanced optical and elastic properties. Ethylene-vinyl acetate elastomers useful herein may be obtained commercially or may be prepared using well known procedures therefor such as, for example, the irradiation method described by Bartl et al. in U.S. Pat. No. 3,160,575.

A preferred elastomeric polymeric composition for use in the present composite extensible film is the new improved film-forming composition also provided by the present invention. This composition is a blend including ethylene-vinyl acetate interpolymer and ethylenepropylene interpolymer components, as more particularly described in the description which follows.

The ethylene-vinyl acetate interpolymer component of the present film-forming composition may include from about 2 to about 30, preferably from about 3 to about 12, and especially from about 4 to about 10 percent by weight of vinyl acetate units. Ethylene-vinyl acetate interpolymers of any suitable melt index and density may be included. Interpolymers of ethylene and vinyl acetate having a melt index of from about 1.5 to about 20 and preferably from about 2 to about 4 grams per 10 minutes are generally suitable. In general, low-density ethylene-vinyl acetate interpolymers, that is from about 0.91 to about 0.925 and preferably from about 0.910 to about 0.920 gram per cubic centimeter, are highly suitable herein. Although this interpolymer component may have any suitable melting point, polymers which when combined with the ethylene-propylene interpolymer component are extrudable at temperatures below about 400° F. e.g. at about 300° to about 400° F., are preferred.

The ethylene-vinyl acetate interpolymer component, referred to for simplicity as the vinyl acetate interpolymer component of the present film-forming composition may be included in an amount from about 1 to about 99 percent, preferably from about 5 to about 95 percent (e.g. from about 20 to about 65 percent) and more preferably from about 20 to about 48 to 50 percent by weight based on the total weight of these two interpolymer components. One or more ethylene vinyl acetate interpolymers are typically included in an amount effective to characterize the blend with a melt index suitable for extrusion thereof in film-forming procedures and accordingly the amount added depends on the relative melt indices of the vinyl acetate interpolymer component and the ethylene-propylene interpolymer component. Inclusion of higher amounts of the vinyl acetate interpolymer component may be found to result in a blend which when formed into film has insufficient elasticity for requirements of users, while inclusion of lower amounts of the vinyl acetate interpolymer component may result in too low a melt index for suitable extrudability of the blend.

The ethylene-propylene interpolymer component of the present film-forming composition may include from about 20 to about 75 and preferably from about 60 to about 75, e.g. 65, percent by weight of ethylene units. Desirably, the ethylene-propylene interpolymer has an average density of 0.92 or less and preferably from about 0.84 to about 0.88, e.g. about 0.86, gram per cubic centimeter. Ethylene-propylene interpolymers of any suitable melt flow rate may be included. In general, ethylene-propylene interpolymers having a melt flow rate from about 0.2 to about 20 and preferably from about 0.4 to about 10 grams per 10 minutes as determined using ASTM test method D-1238-56 T with a test load of 2160 grams at 230° C. are suitable herein. The ethylene-propylene interpolymer component may be a block interpolymer and preferably is a random interpolymer, preferably having a relatively high degree of crystallinity, a relatively low degree of branching, and including propylene units in principally atactic configuration.

An elastomeric ethylene-propylene interpolymer preferred in the present film-forming composition is a random interpolymer having a density of about 0.86 gram per cubic centimeter, a melt-flow rate of about 0.5 gram per 10 minutes as measured by ASTM test method D 1238-65 T using a temperature of 230° C. and a load of 2,160 grams, a melt flow rate of about 27 grams per 10 minutes as measured by ASTM test method D 1238-65 T using a temperature of 190° C. and a load of 21,600 grams, and including ethylene units in an amount of from about 60 to about 70 percent, preferably about 65 percent, by weight, wherein the propylene units are preferably present in at least principal part as atactic polypropylene. This preferred interpolymer is referred to in this description as Elastomer EP-1.

The ethylene-propylene interpolymer component, referred to for simplicity as the propylene interpolymer component, may be present in an amount from about 99 to about 1 percent, preferably from about 95 to about 5 percent (e.g. from about 80 to about 35 percent) and more preferably from about 80 to about 52 to 50 percent by weight based on the total weight of the propylene and vinyl acetate interpolymer components.

Generally, films and film layers having high optical clarity eminently suitable for see-through packages may be prepared using the present composition. Films having generally better optical clarity and improved freedom from haze may be formed from blends of the present invention prepared with ethylene-vinyl acetate interpolymers including from about 3 to about 12 weight percent of vinyl acetate units based on the weight of the vinyl acetate interpolymer.

In a preferred embodiment of the present blend, the ethylene-propylene interpolymer component is Elastomer EP-1 and when formed into film the blend is characterized with substantial freedom from graininess and substantial freedom from cloudiness. In this embodiment it is found critical that the ethylene-vinyl acetate interpolymer component contain less than about 28 (for example from about 3 to about 12) percent by weight of vinyl acetate units, subject to the provision that where the amount of vinyl acetate units in the interpolymer is above 8 percent by weight, the melt index of the ethylene-vinyl acetate interpolymer is less than 7 (for example from about 2 to about 6 and preferably from about 2 to about 4) grams per 10 minutes.

The vinyl acetate interpolymer component and the propylene interpolymer component may be of elastomeric interpolymers. For applications in which a film or film layer having extensibility of 100 or more percent and/or good elastic recovery are required, at least one and preferably both of the interpolymer components are elastomeric.

The film-forming composition may be prepared in any suitable manner, including, for example, mixing the vinyl acetate and propylene interpolymer components using well known mixing procedures which can be carried out by means of conventional apparatus such as ribbon blenders, paddle blenders, tumble mixers and the like. The blends may include additives compatible with the interpolymer components, including slip agents, anti-block agents, anti-fog agents, fillers, dyes, etc. Such additives are well known in the art. The various additives may be mixed with the interpolymer components in any suitable manner, including for example, extrusion blending. Films and film layers of any suitable configuration, including for example, tubular and flat shapes, may be prepared, for example, by extruding the present blends through suitable die orifices using known extrusion procedures. The vinyl acetate interpolymer component and the propylene interpolymer component are preferably supplied as extrudable nodules, pellets, or the like for improved facility of mixing. The various components are preferably composited to form a substantially uniform homogeneous mixture. Composite films including two or more layers and useful in stretch-wrap packaging may be prepared with one or more of the layers formed in the present blend. Such composite films may be formed in any suitable manner, preferably by co-extrusion with suitable extrudable materials compatible therewith. In general, suitable co-extrudable materials include organic thermoplastic compositions, for example interpolymers of ethylene and alkenoic acids, a number of which are set forth hereinabove.

Surprisingly, the present blends may be coextruded with other polymeric materials having substantially higher melt indices to form composite films having high resistance to layer separation over relatively broad use conditions. The blends are eminently suitable for forming hot blown coextruded thin composite films characterized in that the films can be extended at high stretch rates, for example 500 percent elongation per second, under relatively low applied stretching forces such as the forces employed in many known or commercially available stretch-wrap machines. Typically, such composite films are further advantageously characterized with a high degree of elasticity, that is, when stretched about a product (e.g. a tray of fruit or poultry) and subjected to forces which indent the film inwardly of the normal contour of the package, the film typically returns to substantially the normal contour of the package within relatively short periods following removal of the indenting forces.

Another suitable mixture of which the layer of elastomeric composition may be formed is an elastomeric blend of an elastomeric interpolymer of ethylene and propylene and low density polyethylene having a density of from about 0.91 to about 0.925 grams per cubic centimeter.

In general, improved curl resistance is exhibited by the present composite stretch films when formed of two sealable layers of polymeric composition including ethylene-alkenoic acid interpolymers with the first layer of elastomeric polymeric composition disposed intermediate the sealable layers, thereby providing a laminar film of A-B-A construction including three or more layers. Such films may be conveniently prepared without requiring use of adhesives by including the sealable layers in adhering interfacial engagement with, and disposed on opposite surfaces of, the layer including elastomeric composition. Especially good interfacial engagement is observed for sealable layers of ionomeric composition. The films may have any suitable properties and any suitable thickness, the properties generally depending in part on the relative thickness of the layers. For use in a wide variety of stretch-wrap packaging applications the films may have, for example, tensile secant modulus of from about 500 to about 150,000 p.s.i., tensile strength of from about 1,000 to about 16,000 p.s.i., and percent elongation at rupture of from about 50 to about 1,500 percent. When prepared with tensile properties within these ranges, the present films may be effectively used in a variety of hand-wrap and machine-wrap applications, including for example, stretch overwrapping of durable goods, meats, poultry, fish, vegetables (e.g. potatoes), fruits (e.g. apples, peaches and citrus fruits), and the like.

For use in high-speed packaging of these and other products on Automac A-44P machines, the stretch film has the following combination of tensile properties in at least one and preferably in each of two mutually perpendicular film directions: tensile strength of desirably from about 1,000 to about 6,000 p.s.i. and preferably from about 3,000 to about 5,000 p.s.i., elongation at break of desirably from about 50 to about 600 percent and preferably from about 175 to about 485 percent, and tensile secant modulus of desirably from about 1,000 to about 30,000 p.s.i. and preferably from about 1,000 to about 14,950 p.s.i., especially from about 6,000 to about 14,950 p.s.i. The corresponding tensile properties in two mutually perpendicular film directions, e.g. the machine and transverse directions, are desirably within about 75 percent, preferably within about 50 percent, and more preferably within about 25 percent of each other, based on the lower values. Especially good performance in machine packaging applications may be observed for films wherein at least one and preferably both of the sealable layer surfaces have a static coefficient of friction to metal of not more than about 0.6, and preferably from about 0.1 to about 0.6. For use on Automac A-44P machines equipped with feed belts of polyamide, polyester, and the like the static coefficients of friction of both outer layers is desirably from about 0.267 to about 0.5 and preferably from about 0.30 to about 0.50 with respect to metal, and polyester, polyamide, and fabrics of like polymers.

Regarding the preferred ranges of tensile properties set forth above, it is found that films which are within broader aspects of this invention having tensile secant modulus of 15,000 p.s.i. or more and especially above 30,000 p.s.i. are marginally suitable and generally too stiff, respectively, for highspeed stretch-wrap packaging on Automac A-44P machines, while films having tensile secant modulus below 6,000 p.s.i. and especially below 1,000 p.s.i. are marginally suitable and generally too limp, respectively, for suitable machine operation. In attempted highspeed packaging on Automac A-44P machines, film having tensile strength more than 5,000 p.s.i. and especially more than 6,000 p.s.i. is generally found to be marginally suitable and to result in poor separation of sheets from a continuous roll thereof, respectively, while tensile strength of less than 3,000 p.s.i. and especially less than 1,000 p.s.i. results in marginally acceptable and unacceptably high frequency of film breakage on the machine, respectively. Film having extensibility or elongation at break of less than 175 percent and especially less than 100 percent is generally found to be marginally suitable and inadequate, respectively, for suitably stretching about products being packaged, while extensibility in excess of 485 percent and especially in excess of 600 percent generally results in marginally suitable and poor sheet separation from rolls thereof, respectively, thereby rendering the film marginal or commercially unattractive for use in high speed packaging on Automac A-44P machines. At coefficients of static friction to metal, polyamide or polyester much above 0.5 and especially above 0.6, the film is generally not suitably freed from the tuckers in the wrapping station while at coefficients of friction below 0.3 and especially below 0.268 the film is generally not suitably advanced by the plastic belts. The lower limit on coefficient of friction is especially unexpected. Heretofore known packaging films have typically been prepared with concern merely for avoiding high coefficients of friction.

The relative thickness of the component layers of the present stretch film may be selected such as to aid in providing a film characterized with suitable properties. Highly effective films may be characterized with a ratio of thickness in mil units of the layer of elastomeric polymeric composition to the thickness in mil units of each sealable layer of ethylene-alkenoic acid composition of from about 1:2 to about 20:1 and preferably from about 1:1 to about 4:1. Highly suitable films may have, for example, one or two A layers, each of about 0.15 mil in thickness, and a B layer thickness of about 0.7 mil for a total thickness of A-B-A film of about 1 mil.

The present stretch films may have any desired thickness suitable for intended end uses. In general, films having total thickness from about 0.1 mil to about 10 mils are found suitable for many end uses. Thin films having total thickness from about 0.5 mil to about 3 mils and preferably from about 0.5 mil to about 1.5 mils are generally highly suitable for a variety of packaging applications. In food applications, highly effective hand-wrap films may be, for example, about 0.1 to about 1 mil and preferably about 0.7 to about 0.8 mil in thickness, while machine-wrap films are generally greater in thickness, for example, about 0.5 mil to about 3 mils and preferably about 0.9 mil to about 1.1 mils.

The present film desirably has a shrink energy of less than about 100 p.s.i. and preferably less than about 50 p.s.i. While films of this invention having shrink energies above the indicated values are suitable in some packaging applications, films having shrink energies above 50 p.s.i. and especially above 100 p.s.i. are generally found unsuitable for forming heat seals with minimum distortion of the film. Conveniently, the present composite films may be formed with suitably low shrink energy properties by hot blown coextrusion, thereby providing films having minimal orientation and at the same time having highly suitable tensile properties.

The present films may be prepared by any suitable procedure, including lamination of preformed self-supporting films with or without heat or pressure as may be required, melt coating, extrusion lamination by extruding the elastomeric core composition between preformed sealable layers, coextrusion using flat slot dies, and the like.

The present film is preferably formed by the preparation process of this invention which, generally stated, comprises coextruding the elastomeric polymeric composition and the polymeric composition comprising an ethylene-alkenoic acid interpolymer through a suitable tubular film-forming die to form a plural-layer tubular melt and blowing the tubular melt, preferably followed by deflating the blown tube and winding-up the deflated tube. Films having desired physical properties and layer thicknesses can thus be prepared using suitable individual and overall die gaps, blown-up ratio, and draw down rate. For maximum layer-to-layer adhesion, coextrusion is preferably effected using a die temperature of at least equal to the melting point of the lowest melting polymeric composition of the film being formed. A number of elastomeric compositions suitable herein have heretofore not been tubularly extruded without great difficulty. By the process of this invention it is found that ethylene-acidic polymers, especially ionomers and particularly Ionomer A-1 aid in tubular extrusion of elastomeric polymers in simple efficient manner with improved draw down typically being effected. In general, the temperature of the dual extrusion die is preferably from about 350° to about 400° F. although high quality films may effectively be prepared at die temperatures without the indicated range.

Configuration of packages which can effectively be prepared using the present composite extensible films are illustrated, for example, in Modern Packaging, vol. 47, no. 12, for December 1974, at page 147, first column (a see-through six-pack of tomatoes disposed on a tray with a stretched film overwrap), and in greater detail in Fabbri, U.S. Pat. No. 3,662,513, particularly in FIGS. 21 A to 24 A inclusive. Packages of this invention may be prepared in simple efficient manner by stretching the present composite extensible film about a product, which may be one or more items supported on a tray, so that portions of the film overlap one another and sealing the overlapping film portions. Sealing may be effected in any suitable manner, for example, heat sealing.

The present film and packages prepared therefrom are typically characterized with high elasticity; good to excellent optical properties, e.g. low haze, high gloss, and improved transparency and clarity; and seals of higher durability than many polyvinyl chloride film-wrapped packages.

The present films may include various additives to impart desired properties thereto. Thus, for example, the outer layers may include slip additives, anti-blocking agents, antifogging adjuvants, and the like as may be desired or required for intended end uses. The additives may be added at any suitable time, including before, during, and after preparation of the film (as for example by coating). Suitable slip and anti-block additives for use herein include erucamide and the like. Films having a highly suitable combination of slip, anti-block, and anti-fogging properties may be prepared by forming the outer sealable layer or layers of a mixture of ionomeric resin containing from about 1 to about 7 percent by weight of the composition disclosed by Eastes in U.S. Pat. No. 3,451,040 including, e.g. the additives tabulated at column 2 thereof in approximately the relative proportions there shown. More preferably, the outer layer is formed of an ionomeric composition, e.g. Ionomer A-1, including from about 0.1 to about 5 and preferably about 0.5 percent by weight of erucamide and from about 1 to about 10 and preferably from about 3 to about 7 percent by weight of a mixture including about 1 part of ethoxylated hydrocarbyl alcohol, for example ethoxylated lauryl alcohol and preferably ethoxylated cetyl alcohol, about 0.5 part of glycerol monostearate, about 0.375 part of sodium dioctyl sulfosuccinate, and about 0.04 part of finely divided silica gel. Films thus formulated are generally found to be characterized with suitable slip and anti-fog properties for stretch-wrapping a variety of food products.

Other anti-fog agents usefully includable herein are non-ionic surfactants including sorbitan sesquioleate (mixed mono- and di-oleates); polyethylene sorbital oleate laurate; polyethylene glycol lauryl ether; diethylene glycol monostearate; polyethylene esters of fatty acids or rosin acids; di-N-substituted amides, e.g.

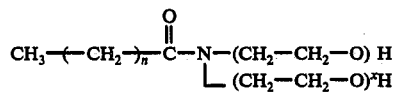

where $n$ is about 10 to about 30 and $x$ and $y$ are 1 to about 30; alkyl phenoxy (polyethoxy) ethanols containing, for example, from 1 to 20 ethoxy groups; polyethylene glycol stearate; fatty acid alkanolamides; ethoxylated thio ethers, e.g. $C_{12}H_{25}S(CH_2CH_2O)_nCH_2CH_2OH$ wherein $n$ is from about 1 to about 30; condensation products of ethylene oxide and polypropylene glycol; solidified urea complexes of polyethylene glycol ester of mixed fatty and rosin acids; sorbitan monopalmitate; sorbitan monooleate; polyethylene glycol esters of tall oil acids; ethoxylated alkaryls, e.g. p-alkyl $C_6H_4(OCH_2CH_2)_nOH$ where alkyl is diisobutyl; tris (polyoxyethylene) sorbitan monolaurate; tris (polyoxyethylene) sorbitan monooleate; Atmer (I.C.I. trademark) 645, believed to be a mixture of polyethylene glycol (400) monolaurate and an amide or substituted amide; mono-, di-, and tri-glycerol monostearate; and the like. These anti-fog agents may be included in the ionomeric composition in suitable amounts up to, for example, 7 weight percent. Where good anti-fog properties are desired, as in packaging cold poultry and other cold moisture-releasing products, in multi-layer A-B-A films, it is generally sufficient to include anti-fog agent in only one of the outer film layers. Highly suitable packages may be prepared from such films with the anti-fog layer facing the packaged product.

In a preferred aspect of this invention, the present composite stretch film is formed of a first layer of the present film-forming composition having an elastomeric ethylene-vinyl acetate interpolymer component and an elastomeric ethylene-propylene interpolymer component and at least one sealable layer formed of a composition including Ionomer A-1 adhered to a surface of the first layer. In an especially preferred aspect two sealable layers each formed of a composition including Ionomer A-1 are included in adhering interfacial engagement with the sealable layers disposed on opposite surfaces of the layer formed of the present film-forming composition, thereby providing a three-layer laminar film of A-B-A construction. In a preferred embodiment film within the last-mentioned aspect the B layer is formed of a blend of (I) about 50 parts by weight of elastomeric ethylene-propylene including about 65 percent by weight of ethylene units and about 35 percent by weight of propylene units and (II) about 50 parts by weight of ethylenevinyl acetate interpolymer including about 4 to 5 percent by weight of vinyl acetate units. This embodiment film, herein referred to for simplicity as Film EMB-I, is preferably a hot blown coextruded film and may have any suitable tensile secant modulus, e.g. from about 1,000 to about 30,000 p.s.i. For use in hand-wrap packaging of trayed meat, poultry, and produce this embodiment film may have tensile secant modulus of from about 1,000 to about 30,000 p.s.i. and elongation at break of from about 50 to about 600 percent.

For use in high-speed packaging of these and other products on Automac A-44P machines, Film EMB-1 desirably has the following tensile properties in at least one film direction and preferably in two mutually perpendicular film directions: tensile strength of from about 1,000 to about 6,000 p.s.i. and preferably from about 3,000 to about 5,000 p.s.i., elongation at break of from about 100 to about 600 percent and preferably from about 175 to about 485 percent, and tensile secant modulus of from about 1,000 to about 30,000 p.s.i. and preferably from about 1,000 to about 14,950 p.s.i., and especially from about 6,000 to about 14,950 p.s.i. The corresponding tensile properties in two mutually perpendicular film directions, e.g. the machine and transverse directions, are desirably within about 75 percent, preferably within about 50 percent, and more preferably within about 25 percent of each other, based on the lower values. Especially good performance in machine packaging applications may be observed for Film EMB-I wherein at least one and preferably both of the sealable layer surfaces have a static coefficient of friction to metal of not more than about 0.6, and preferably from about 0.1 to about 0.6. For use on Automac A-44P machines equipped with feed belts of polyamide, polyester, and the like the static coefficients of friction of both outer layers is desirably from about 0.267 to about 0.5 and preferably from about 0.30 to about 0.50 with respect to metal, and polyester, polyamide, and fabrics of like polymers.

Film EMB-I may be characterized with a ratio of thickness in mil units of the layer of elastomeric polymeric composition to the thickness in mil units of each sealable layer containing Ionomer A-1 of from about 1:1 to about 4:1. Highly suitable films of this embodiment may have, for example, one or two A layers, each of about 0.15 mil in thickness, and a B layer thickness of about 0.7 mil for a total thickness of A-B-A film of about 1 mil. This embodiment film may have total thickness as described above.

In another preferred embodiment of the present composite film, low-density polyethylene having density from about 0.910 to about 0.925 is substituted for the ethylene-vinyl acetate interpolymer component of the blend used in the B layer of Film EMB-I. This embodiment film, herein referred to for simplicity as Film EMB-II, is preferably a hot blown coextruded film and may have any suitable tensile secant modulus e.g. from about 1,000 to about 30,000 p.s.i. Film EMB-II may have properties, layer and overall thickness as set forth in the above description given with reference to Film EMB-I.

In another especially preferred aspect two sealable layers each formed of a composition including Ionomer A-1 are included in adhering interfacial engagement with the sealable layers disposed on opposite surfaces of a layer formed of a block thermoplastic elastomer terminated at both ends by polystyrene blocks, and having an intermediate block of a polydiene with or without residual reactive unsaturation, thereby providing a three-layer laminar film of A-B-A construction. In a preferred embodiment film within the last-mentioned aspect the B layer is formed of a thermoplastic block copolymer of about 25 weight percent styrene and about 75 weight percent butadiene having terminal polystyrene blocks at each end, an elastomeric polybutadiene block intermediately disposed, a melt index of about 4.8, a melt flow rate of about 24 grams per 10 minutes as determined by ASTM test method D 1238-65 T(Condition G), and a density of about 0.964 grams per cubic centimeter. This embodiment film, herein referred to for simplicity as Film EMB-III, is preferably a hot blown coextruded film and may have any suitable tensile secant modulus, e.g. from about 1,000 to about 30,000 p.s.i. Film EMB-III may have properties, layer and overall thickness as set forth in the above description given with reference to Film EMB-I.

Tensile secant modulus, tensile strength and percent elongation of film are determined from tensile stress-strain data developed in air, at 22° to 24° C. and 48 to 52 percent relative humidity. The stress-strain data is developed by elongating a specimen of the film in a tensile tester until the specimen breaks. Simply stated, tensile strength is the load or force applied at break per unit area of the film specimen, usually expressed in p.s.i., while ultimate extensibility (i.e. percent elongation) is the increase in length of the specimen at break, expressed as percent of the initial length of the specimen. Tensile secant modulus is calculated by dividing the stress in p.s.i., as measured typically at a low specified elongation or strain, by the corresponding selected elongation in percent. Tensile strength and tensile secant modulus are expressed in units of force per initial area of the specimen taken normal to the direction of elongation. For film specimens characterized with direct proportionality between stress and strain throughout the range of low strain, that is from about 1 to about 10 percent strain, the tensile secant modulus is independent of the strain selected for calculation thereof. Thus, for films having a substantially rectilinear stress-strain diagram in the range from 1 to 10 percent strain, substantially the same tensile secant modulus value is found from calculations based on strains of, for example, 1 and 10 percent.

Except where otherwise indicated, the various properties set forth in the description of this invention and the appended claims are measured using the tests indicated below.

Tensile secant modulus is calculated by Calculation 10(h) of ASTM D 882-64T from stress-strain data at 10 percent strain developed using the "Procedure" and "Calculations" sections set forth in ASTM Designation: D 882-56T, Method C. Tensile strength and percent elongation at break or rupture are measured as described in Method C of ASTM Designation D 882-56T. In determining strain and percent elongation the ratio of uncorrected to corrected elongation is taken as one.

Melt flow rate is determined by ASTM Designation D 1238-65T using conditions of temperature and test load as specified therein. Melt index is a particular melt flow rate determined according to Condition E of ASTM D 1238-65T, that is at 190° C. using a test load of 2,160 grams. Unless otherwise indicated, melt flow rate and melt index are expressed in grams per 10 minutes.

Shrink energy is the force of contraction at a given temperature when the material is restrained from contraction. More specifically, it is the measurable tension in a fully mono-directionally restrained strip of film when the film is at a specified temperature (e.g. about 70° F.). Shrink energy is measured by ASTM test method D 2838.

Melting point of thermoplastic polymers is conveniently approximated by crystalline freeze point as determined by melting a sample of the polymer, inserting a thermocouple into the molten polymer and allowing the molten polymer to cool slowly. The temperature is recorded and plotted as a function of cooling time. The crystalline freeze point is the temperature corresponding to the first plateau in the time-temperature cooling curve.

Softening point of thermoplastic polymers is determined by plotting "softness" values as a function of temperature. The temperature at which the slope of the resulting curve equals 0.0035 softening units per ° F. is the softening point. "Softness" is determined by the method of Karrer, Davies and Dietrich, *Industrial and Engineering Chemistry, Anal. Ed.*, 2, 96–99 (1930).

Samples for density measurement are conditioned by ASTM method D 1248-65T for a sample in the density range of 0.910 to 0.940 gram per cubic centimeter. Density is determined using the procedure of ASTM Designation D 1505-63T.

Static coefficient of friction is measured by a moving block procedure as follows. A film sample is carefully wrapped around a ½-inch × 1½-inch × 2-inch 200-gram steel block. The film is snugly fitted and taped so that the film is wrinkle free on the 1½-inch × 2-inch underside of the block. The film-covered block is placed on a fixed-end stainless steel horizontal platform which is thereafter slowly raised at its free end using a constant angular rate. The angle of displacement from the horizontal reference at which motion of the block first occurs is observed. The static coefficient of friction is the tangent of this angle. Other materials are fastened to the platform for determining the static coefficients of friction thereto.

Blow-up ratio for blown extruded film is calculated by multiplying the lay-flat width of the film in inches by 0.637 and dividing the resulting number by the average diameter of the closed loop die orifice in inches.

Practice of the present invention is further illustrated by the following non-limiting examples. All parts, percentages and ratios given throughout this specification and the appended claims are by weight unless otherwise indicated. Tensile property data set forth in the following examples is determined from stress-strain graphs generated using a Scott IP-4 tensile tester unless otherwise indicated.

EXAMPLE 1

A three-layer self-supporting tubular film about 1 mil in thickness, including an inner B layer formed of an ethylene-vinyl acetate interpolymer and two outer A layers each formed of an ethylene-acrylic acid interpolymer composition, is prepared by melt-extruding a film-grade elastomeric ethylene-vinyl acetate interpolymer including about 28 percent of vinyl acetate units and having a melt index of 2 and a density of 0.92 through a first extruder and concurrently melt-extruding from second and third extruders melts of an ethylene-acrylic acid interpolymer composition including about 8 percent of acrylic acid units interpolymerized therein. Using apparatus substantially as described by Raley in U.S. Pat. No. 3,223,761, incorporated herein in pertinent part by reference, the melted thermoplastic material from each extruder is fed into a coaxial adapter followed by discharging the composite, concentric cylindrical stream of plastic into an annular die assembly having a mandrel axially piercing and radially distributing the cylindrical stream into a tubular stream to form a continuous seamless tubing.

The inner B layer of elastomeric ethylene-vinyl acetate interpolymer is formed by extruding this interpolymer at a rate of 31 pounds per hour through a first extruder having a 17:1 ratio of L:D (length to diameter) and a diameter of ¾ inch to 1½ inches. Other operating conditions for the first extruder are a barrel temperature of 350° F. and a discharged melt temperature of 350° to 400° F. Extrusion of each outer A layer, one of which is the inner layer of the tubular extrudate, is at a rate of 5 pounds per hour through second and third extruders each having a 17:1 ratio of L:D and a diameter of ¾ inch operated at a barrel temperature of 300° to 400° F. and a discharged melt temperature of 350° to 400° F. The system of extruders, adaptor, and die assembly includes a cooling ring supplied with air at about 40° F. and an annular orifice of 4 inches in average diameter and gap thickness of about 35 mils (i.e., 0.035 inch). Other operating conditions include a B.U.R. (blow-up ratio) of about 3:1 and deflated tube wind-up or take-off rate on a wind-up reel of about 32 feet per minute of 18-inch lay-flat width of the film. The flattened dual wall tubular film is thereafter slit along opposite edges to form a flat single wall multi-layer film corresponding to the tubular wall.

The resulting composite film includes the ethylene-vinyl acetate interpolymer core layer in a thickness of about 0.7 mil and each outer layer of ethylene-acrylic acid interpolymer composition in a thickness of about 0.15 mil. The film is found to have high extensibility, good tensile strength, suitable tensile secant modulus, good elasticity, and highly suitable heat sealability. The film is judged eminently suitable for stretch overwrapping tray-supported articles in handwrap applications.

EXAMPLES 2-24

Multi-layer single wall and dual wall A-B-A composite films of this invention are prepared using the hot blown coextrusion procedure of Example 1 except that the layer materials and approximate extrusion conditions and film characteristics are as indicated in Table I. In the tables "Ult. elongation" means ultimate elongation, i.e. elongation at break, "Tensile Secant Mod." means tensile secant modulus, "Tensile Str." means tensile strength, and tensile data to the left of a slash (/) and to the right of a slash are for machine direction and transverse direction, respectively. In general, these films are found to be extensible and have good tensile properties.

TABLE I

Part A

| Example No. | 2 | 3 | 4 | 5 | 6 | 7 | 8 | 9 |
|---|---|---|---|---|---|---|---|---|
| Tubularly Inner A layer | | | | | | | | |
| Polymeric Material | Ionomer A-1 | Ionomer A-1 | Ionomer A-1 | Ionomer A-1 | Ionomer A-1 | Ionomer A-1 | Ionomer A-1 | Ionomer A-1 |
| Thickness (mils) | 0.13 | 0.12 | 0.19 | 0.13 | 0.18 | 0.10 | 0.18 | 0.13 |
| Extruder | | | | | | | | |
| Barrel temp. (° F) | 330 | 330 | 330 | 300 | 300 | 300 | 300 | 300 |
| Melt temp. (° F) | 350 | 350 | 350 | 350 | 350 | 350 | 350 | 350 |
| Tubularly Outer A layer | | | | | | | | |
| Polymeric Material | Ionomer A-1[1] | Ionomer A-1[1] | Ionomer A-1[1] | Ionomer A-1 | Ionomer A-1 | Ionomer A-1 | Ionomer A-1 | Ionomer A-1 |
| Thickness (mils) | 0.13 | 0.12 | 0.19 | 0.16 | 0.18 | 0.10 | 0.18 | 0.13 |
| Extruder | | | | | | | | |
| Barrel temp. (° F) | 330 | 330 | 330 | 300 | 300 | 300 | 300 | 300 |
| Melt temp. (° F) | 350 | 350 | 350 | 350 | 350 | 350 | 350 | 350 |
| B Layer | | | | | | SBS | EVA | SBS-EVA |
| Polymeric Material | Polyurethane[2] | Polyester[3] | Polyallomer[4] | SBS[5] | SBS[6] | blend[7] | (28%VA)[8] | blend[9] |
| Thickness (mils) | 0.60 | 0.80 | 0.89 | 0.73 | 0.82 | 0.50 | 0.84 | 0.60 |
| Extruder | | | | | | | | |
| Barrel temp. (° F) | 330 | 330 | 400 | 300 | 300 | 300 | 300 | 300 |
| Melt temp. (° F) | 350 | 350 | 400 | 350 | 350 | 350 | 350 | 350 |
| Die | | | | | | | | |
| Temperature (° F) | 350-375 | 350-375 | 375-400 | 350 | 350 | 350 | 350 | 350 |
| Orifice diam. (inches) | 4 | 4 | 4 | 4 | 4 | 4 | 4 | 4 |
| Orifice gap (mils) | 45 | 45 | 45 | 28 | 28 | 28 | 28 | 28 |
| Blown Film | | | | | | | | |
| Thickness (mils) | 1.72 (dw)* | 1.04 | 1.28 | 1.02 | 1.18 | 0.70 | 1.20 | 0.85 |
| Blow up ratio | 3:1 | 3:1 | 3:1 | 3:1 | 3:1 | 3:1 | 3:1 | 3:1 |
| Take-off rate (ft./min.) | 35 | 26 | 23 | 29-30 | 25 | 42 | 25 | 35 |
| Tensile secant mod. (p.s.i.) | 11,110/ 12,500 | 15,000/ 16,365 | 14,815/ 16,665 | 14,000/ 12,000 | 10,000/ 9.600 | 16,600/ 13,800 | 13,635/ 12,200 | 11,200/ 12,220 |
| Ult. elongation (%) MD/TD | 180/300 | 260/445 | 360/435 | 375/455 | 260/410 | 530/570 | 180/385 | 130/380 |
| Tensile Str. (p.s.i.) MD/TD | 2970/3945 | 3415/5455 | 5750/5110 | 3150/2800 | 2050/2700 | 4000/2400 | 3700/3100 | 2500/2550 |

Part B

| Example No. | 10 | 11 | 12 | 13 | 14 | 15 | 16 | 17 |
|---|---|---|---|---|---|---|---|---|
| Tubularly Inner A layer | | | | | | | | |
| Polymeric Material | Ionomer A-1 | Ionomer A-1 | Ionomer A-1[11] | Ionomer A-1 | Ionomer A-2 | Ionomer A-1[20] | Ionomer A-1 | Ionomer A-1 |
| Thickness (mils) | 0.12 | 0.05 | 0.19 | 0.13 | 0.13 | 0.16 | 0.15 | 0.15 |
| Extruder | | | | | | | | |
| Barrel temp. (° F) | 300-350 | 300-350 | 300-350 | 300-350 | 300-350 | 300-350 | 300-350 | 300-350 |
| Melt temp. (° F) | 350 | 350 | 350 | 350 | 350 | 350 | 350 | 350 |
| Tubularly Outer A layer | | | | | | | | |
| Polymeric Material | Ionomer A-1 | Ionomer A-1 | Ionomer A-1[11] | Ionomer A-1 | Ionomer A-2 | Ionomer A-1[20] | Ionomer A-1 | Ionomer A-1 |
| Thickness (mils) | 0.24 | 0.11 | 0.19 | 0.13 | 0.13 | 0.16 | 0.15 | 0.15 |
| Extruder | | | | | | | | |
| Barrel temp. (° F) | 300-350 | 300-350 | 300-350 | 300-350 | 300-350 | 300-350 | 300-350 | 300-350 |
| Melt temp.(° F) | 350 | 350 | 350 | 350 | 350 | 350 | 350 | 350 |
| Die | | | | | | | | |
| Temperature (° F) | 350-375 | 350-375 | 350 | 350-375 | 350 | 350 | 350 | 350 |
| Orifice diam. (inches) | 4 | 4 | 4 | 4 | 4 | 4 | 4 | 4 |
| Orifice gap (mils) | 28 | 28 | 28 | 28 | 28 | 28 | 28 | 28 |
| Blown Film | | | | | | | | |
| Thickness (mils) | 0.73 | 0.66(dw)* | 1.28 | 0.88 | 0.85 | 1.05 | 0.98 | 1.02 |
| Blow up ratio | 3:1 | 3:1 | 3:1 | 3:1 | 3:1 | 3:1 | 3:1 | 3:1 |
| Take-off rate (ft./min.) | 39 | 78 | 23 | 35 | 34 | 27 | 30 | 28 |
| Tensile Secant mod. (p.s.i.) | 17,145/ 13,335 | 25,715/ 17,000 | 11,740/ 8,570 | 28,890/ 30,590 | 13,335/ 13,750 | 12,000/ 9,090 | 18,000/ 14,210 | 25,000/ 15,650 |
| Ult. elongation (%) MD/TD | 200/360 | 75/410 | 600/600 | 260/500 | 200/470 | 220/420 | 165/390 | 235/475 |
| Tensile Str. (p.s.i) MD/TD | 3500/3850 | 4450/3400 | 2600/2470 | 2600/3900 | 5200/4500 | 3125/4250 | 2400/2200 | 3300/3550 | 5600/4050 |

Part C

| Example No. | 18 | 19 | 20 | 21 | 22 | 23 | 24 |
|---|---|---|---|---|---|---|---|
| Tubularly Inner A layer | | | | | | | |
| Polymeric Material | Ionomer A-1 | Ionomer A-1 | Ionomer A-1[21] | Ionomer A-1 | Ionomer A-1 | Ionomer A-1 | Ionomer A-2 |
| Thickness (mils) | 0.15 | 0.13 | 0.12 | 0.17 | 0.15 | 0.14 | 0.16 |
| Extruder | | | | | | | |
| Barrel temp. (° F) | 300-350 | 300-350 | 300-350 | 325-375 | 350 | 350 | 350 |
| Melt temp. (° F) | 350 | 350 | 350 | 375 | 350 | 350 | 350 |
| Tubularly Outer A layer | | | | | | | |
| Polymeric Material | Ionomer A-1[1] | Ionomer A-1 | Ionomer A-1[21] | Ionomer A-1 | Ionomer A-1 | Ionomer A-1 | Ionomer A-2 |
| Thickness (mils) | 0.15 | 0.13 | 0.12 | 0.17 | 0.15 | 0.14 | 0.16 |
| Extruder | | | | | | | |
| Barrel temp. (° F) | 300-350 | 300-350 | 300-350 | 320-370 | 350 | 350 | 350 |
| Melt temp. (° F) | 350 | 350 | 350 | 370 | 350 | 350 | 350 |
| B Layer | EPR- | EPR- | EVA | EPR- | EPR- | EPR- | EPR- |
| Polymeric Material | LDPE[16] | LDPE[17] | blend[18] | EVA(1:1)[19] | EVA(1:1)[19] | EVA(1:1)[19] | EVA(1:1)[19] |
| Thickness | 0.70 | 0.61 | 0.54 | 0.77 | 0.70 | 0.63 | 0.75 |
| Extruder | | | | | | | |
| Barrel temp. (° F) | 300-350 | 300-350 | 300-350 | 375-400 | 350-400 | 350-400 | 350-400 |
| Melt temp. (° F) | 350 | 350 | 350 | 375 | 375 | 375 | 375 |

TABLE I-continued

| | | | | | | | |
|---|---|---|---|---|---|---|---|
| Die Temperature (° F) | 350 | 350 | 350 | 375–400 | 375 | 375 | 375 |
| Orifice diam. (inches) | 4 | 4 | 4 | 10 | 10 | 10 | 4 |
| Orifice gap (mils) | 28 | 28 | 28 | 90 | 90 | 90 | 45 |
| Blown Film Thickness (mils) | 1.00 | 0.87 | 0.78 | 1.11 | 1.0 | 0.91 | 1.07 |
| Blow up ratio | 3:1 | 3:1 | 3:1 | 2:1 | 2.7:1 | 2.7:1 | 2:1 |
| Take-off rate (ft./min.) | 30 | 33 | 36 | 30 | 76 | 89 | 27 |
| Tensile secant mod. (p.s.i.) | ≦13,635/ ≦13,635[22] | 22,750/ 17,365 | 15,335/ 12,500 | 11,400/ 10,900 | 20,000/ 16,365 | 22,220/ 16,665 | 23,000/ 18,500 |
| Ult. elongation (%) MD/TD | 240/500 | 190/530 | 300/405 | 410/520 | 230/370 | 130/140 | 190/525 |
| Tensile Str. (p.s.i.) MD/TD | 4585/4180 | 6150/4650 | 3350/2800 | 4300/2600 | 3910/2635 | 4220/2610 | 4650/4400 |

[1]The ionomer includes 4 percent of a mixture of 1 part ethoxylated lauryl alcohol, 0.5 part glycerol monostearate, 0.375 part sodium dioctyl sulfosuccinate, and 0.04 part finely divided silica, and ⅛ percent of erucamide.
[2]Estane™ 5701 (B. F. Goodrich and Co.)
[3]Hytrel™ 4055 (Du Pont Co.)
[4]Tenite™ Polyallomer 5B20 (ethylene-propylene interpolymer with principally atactic polypropylene units-Eastman Chemical Products, Inc.)
[5]Kraton™ X 2113 (interpolymerized styrene-butadiene-styrene block thermoplastic elastomer containing about 25 to 30 percent styrene units and about 75 to 70 percent butadiene units and having a melt index of about 4.8 grams per 10 minutes, and a melt flow rate of about 24 grams per 10 minutes as determined by ASTM test method D 1238-65T at 200° C. using a load of 5000 grams - Shell Chemical Co.)
[6]Kraton™ X 2112 (interpolymerized styrene-butadiene-styrene block thermoplastic elastomer containing about 25 to 30 percent styrene units and about 75 to 70 percent butadiene units and having a melt index of about 22 grams per 10 minutes, and a melt flow rate of about 115 grams per 10 minutes as determined by ASTM test method D 1238-65T at 200° C. using a load of 5000 grams - Shell Chemical Co.)
*Double-wound film, i.e. the wound-up film is not slit into single-wall film.
[7]Blend of equal parts of Kraton X 2112[6] and Kraton X 2113[5], prepared by tumble mixing the nodular ingredients to substantially uniform mixture
[8]Ethylene-vinyl acetate elastomer containing about 28 percent vinyl acetate units and having melt index of about 6 grams per 10 minutes
[9]Blend of equal parts of Kraton X 2112 and 28 percent VA EVA[8], prepared by tumble mixing the nodular ingredients to substantially uniform mixture
[10]Including 1.5 percent mineral oil uniformly admixed with the elastomer[5] by tumble mixing.
[11]Same as in note (1) except erucamide is omitted.
[12]Super Dylan 5503 polybutene hydrocarbon rubber product by Sinclair-Koppers.
[13]Elastomer EP-1 described hereinbefore (an elastomeric ethylene-propylene interpolymer)
[14]Blend of equal parts of Elastomer EP-1[13] and ethylene-propylene-nonconjugated diene terpolymer elastomer
[15]Blend of equal parts of Elastomer EP-1[13] and low density polyethylene (0.92 gram per cubic centimeter)
[16]Blend of 30 parts of Elastomer EP-1[13] and 70 parts of low density polyethylene having density of 0.92
[17]Blend of 60 parts of ethylene-propylene-nonconjugated diene terpolymer elastomer and 40 parts of low (0.92) density polyethylene
[18]Blend of equal parts of two ethylene-vinyl acetate elastomers each containing about 28 percent vinyl acetate units and having melt indices of about 6 and about 23 to 27, respectively.
[19]Blend of equal parts of Elastomer EP-1[13] and an ethylene-vinyl acetate interpolymer including about 4.5 percent vinyl acetate units and having a melt index of about 2 grams per 10 minutes.
[20]The ionomer includes ⅛ percent of erucamide mixed therein by dry blending in a tumble mixer.
[21]The ionomer includes 7 percent of a mixture of 1 part ethoxylated lauryl alcohol, 0.5 part glycerol monostearate, 0.375 part sodium dioctyl sulfosuccinate, and 0.04 part finely divided silica.
from 8,000 to 13,635 p.s.i. in the machine direction and transverse direction.
[22]The tensile secant modulus is from 8,000 to 13,635 p.s.i. in the machine direction and transverse direction.

Tests show that the film of Example 12 has a static coefficient of friction to metal of about 0.53 to 0.75, the Example 17 film has a static coefficient of friction to metal of about 0.36 to 0.51, and that the film of Example 21 has static coefficients of friction of 0.49 (to metal) and 0.69 (polyester).

The films of Examples 2-24 are evaluated as indicated below for heat sealability characteristics, clarity, gloss, elasticity in stretched condition, and/or packaging performance on an Automac Model A-44P stretch wrap packaging machine equipped with a serrated knife perforating device and polyester belts for feeding severed sheets of film. The films are supplied from supply rolls having uniform width in the range of about 11 inches to about 20 inches and the machine is set for severing sheets of the film in uniform lengths in the range of about 16 inches to about 26 inches. In the packaging evaluations, the product to be packaged is a group of six peaches uniformly arranged in two parallel rows of three peaches each disposed in a semi-rigid No. 4 tray having length of 12 inches, width of 6 inches, and an upwardly tapering peripheral wall of about 1 inch height.

These films are found to have good to very good heat sealability characteristics with strong fused heat seals being formed at sealing temperatures of 200° to 300° F. The fused seals are generally superior to the tack seals which result from heat sealing films of polyvinyl chloride and are found to exhibit greater resistance to penetration of moisture into the packaged product than typically is found for heat seals of polyvinyl chloride film.

Visual observations of these films show that the films of Examples 2 to 7, 10, and 12 to 23 inclusive have at least sufficient clarity for suitable use in packaging applications where easily seen-through packages are desired. The clarity ratings for these films are shown in the following ratings where the films are identified by the example numbers in parentheses: excellent (5); very good (6, 10, 12 to 16, 19, 21 to 23, inclusive); between very good and good (2 and 4); good (3, 7, 17 and 18); and between good and fair (20). The double-wound film of Example 11 and the single wall films of Examples 8, 9 and 24 are not recommended for packaging applications requiring maximum see-through properties due to the observed haziness thereof. All the films of Examples 2 to 24 inclusive are found to have good to very good gloss. In general, from the standpoints of clarity and gloss the films of these examples compare favorably with polyvinyl chloride films, which range from between fair and good to excellent.

From the standpoints of degree and quickness of recovering from indentation when in stretched condition, the films of Examples 2, 17, 22 and 23 are found to have very good elasticity; the elasticity of the film of Example 12 is found to be between good and very good; the films of Examples 3, 5, 6, 18, 21 and 24 are found to have good elasticity; the films of Examples 10, 11 and 15 are found to have between fair and good elasticity; and the films of Examples 7, 8, 9, 14, 16, 19 and 20 are found to have fair elasticity. Poor recovery is observed for the films of Examples 4 and 13.

The films of Examples 2 to 24 inclusive are useful for making hand wrapped packages having the films stretched about products including durable goods, e.g. hand tools, meat, poultry, fruits, and vegetables, alone and in combination with supports such as trays and the like.

The films of Examples 5 to 17, 19 to 21 and 24, inclusive, are tested for packaging performance on an Automac A-44P machine set for wrapping at 40 packages per minute. The films of Examples 5 to 10, 15, 21 and 24, inclusive, are found to effectively stretch wrap at this high packaging rate. While the slip characteristics of these films and the extent to which the resulting packages are free from tails are judged commercially atractive, these properties of the films are generally enhanced by incorporating suitable slip agents into at least one and preferably both outer A layers, in an amount effective for lowering the coefficients of friction thereof to metal and to the machine belt material to within the preferred range set forth above. (For example, observations of packages prepared at 40 packages per minute using the film of Example 33 below show no tails. The film of that example includes an outer layer of Ionomer A-1 including one percent erucamide, which layer is positioned on the outside of the packages.)

The failure of the films of Examples 11, 12 and 13 to perform satisfactorily at 40 packages per minute illustrates the inadequacy of films having ultimate elongation below 100 percent, the marginal acceptability of films having tensile strength below 3,000 p.s.i. and the unsuitability of films having tensile secant modulus above 30,000 p.s.i. from the standpoint of performance on the Automac A-44P machine. The film of Example 14 is judged suitable for high-speed packaging on the machine at rates of about 30 to 35 packages per minute.

The marginal effectiveness in machine performance of films of the present invention having tensile strength below 3,000 p.s.i. but not below 1,000 p.s.i. is illustrated by an observed 20 percent incidence of breakage for the film of Example 15. The failure of the film of Example 16 to perform satisfactorily at 40 packages per minute illustrates the marginal suitability in machine performance of the present films having an ultimate elongation below 175 percent and a tensile secant modulus between 15,000 p.s.i. and 30,000 p.s.i. This film is judged suitable for high-speed packaging at about 30–35 packages per minute on the Automac A-44P.

The effect of marginally suitable secant modulus and unacceptability of tensile strengths over 6,000 p.s.i. regarding machinability are shown by the failure of the films of Examples 17 and 19 to perform satisfactorily at 40 packages per minute. These films are judged suitable for lower packaging rates on the Automac A-44P. The observed failure of the film of Example 20 to satisfactorily perform at 40 packages per minute on the Automac machine further illustrates the importance of the lower limit of the especially preferred tensile strength range.

Examples 21 to 24 inclusive illustrate effects of operating conditions in preparation of the present film by hot blown coextrusion.

In general, MD tensile secant modulus, MD tensile strength, and TD ultimate elongation decrease with decreasing die gap, increasing die diameter, and increasing blow-up ratio; while TD tensile secant modulus, TD tensile strength, and MD ultimate elongation increase with decreasing die gap, increasing die diameter, and increasing blow-up ratio. Conversely, MD tensile secant modulus, MD tensile strength, and TD ultimate elongation increase with increasing die gap, decreasing die diameter, and decreasing blow-up ratio; while TD tensile secant modulus, TD tensile strength, and MD ultimate elongation decrease with increasing die gap, decreasing die diameter, and decreasing blow-up ratio.

EXAMPLE 25-A

This example illustrates the critical effect of the range of vinyl acetate content of the ethylene-vinyl acetate elastomer component of the film-forming blend of this invention in an embodiment thereof characterized with ability to form films having high clarity. A polymer blend is prepared by uniformly admixing equal parts of Elastomer EP-1 and an elastomeric ethylene vinyl acetate interpolymer containing about 28 percent vinyl acetate units and having a melt index of about 6. A 5- to 10-mil film prepared of this blend using well known extrusion techniques is found to have such graininess and cloudiness as to be unacceptable for see-through packaging applications where good clarity is required throughout.

EXAMPLE 25-B

The procedure of Example 25-A is repeated except that the ethylene vinyl acetate elastomer thereof is replaced by an elastomeric ethylene vinyl acetate interpolymer containing about 28 percent vinyl acetate units and having a melt index of about 23 to 27. The results are substantially the same.

EXAMPLE 25-C

The procedure of Example 25-A is again repeated except that the ethylene vinyl acetate elastomer thereof is replaced by an elastomeric ethylene vinyl acetate interpolymer containing about 8.5 percent vinyl acetate units and having a melt index of 7. The results are substantially the same.

EXAMPLES 26–43

Taken with the foregoing Examples 21 to 24 inclusive, the B layers of which are found to have excellent optical clarity, that is highly capable of being seen through, these examples further illustrate the film-forming composition of this invention. Each blend of interpolymers used in these examples is prepared by tumble mixing the interpolymers in the approximate amounts indicated in Table II until the mixture is substantially uniform throughout.

In Example 26 a 3.2-mil thick film is formed by hot blown coextrusion of a blend containing equal parts of Elastomer EP-1 (described hereinabove) and an ethylene vinyl acetate interpolymer including about 4.5 percent vinyl acetate units and having a melt index of about 2. The blend is melt extruded at a melt temperature of about 325° to 350° F. through an annular die of about 10 inches diameter and about 90 mils gap width. The resulting tubular melt is cooled with air supplied at a temperature of 40° F. from a cooling ring and blown with air using a blow-up ratio of about 2.5:1. After deflating the tube, tests show that the resulting film has tensile secant moduli of about 6970 p.s.i. in the machine direction and about 6770 in the transverse direction. Ultimate elongations of this film are about 400 percent in the machine direction and over 560 percent in the transverse direction. Tensile strengths of the film are about 2180 and about 1260 in the machine and transverse directions in the order given. This film having low tensile secant moduli is judged highly suitable for stretch overwrapping produce in handwrap packaging applications, including such applications for which flexible films of plasticized polyvinyl chloride have heretofore been used.

In Examples 27 to 43 inclusive the component polymers are blended using a wide range of ratios of Elastomer EP-1 to ethylene vinyl acetate interpolymers including about 4.5 percent vinyl acetate units (Examples 27 to 35 and 43 inclusive) and about 9.5 percent vinyl acetate units (Examples 36 to 42 inclusive) with resulting high-clarity film-forming properties as observed for a variety of hot blown coextruded composite films, process and property data for which are presented in Table II.

The films of Examples 27 to 29 illustrate embodiment composite stretch films of this invention including a core layer of the present film-forming composition having adhered to at least one surface thereof an organic thermoplastic polymer. In the embodiments of these examples the polymeric outer layers are generally tacky ethylene-vinyl acetate interpolymers having low amounts of vinyl acetate units. These composite films exhibit from fair to good optical clarity and gloss and suitable heat sealability and elastic recovery. They are judged highly suitable for hand stretch wrap packaging of produce and poultry.

The films of Examples 30 to 43 also illustrate composite stretch films of this invention having outer layers of ionomeric compositions. These films are evaluated as indicated below for heat sealability characteristics, clarity, gloss, elasticity in stretched condition, and/or packaging performance on an Automac Model A-44P stretch wrap packaging machine as set forth in Examples 2–24 above.

These films are found to have good to very good heat sealability characteristics with strong fused heat seals being formed at sealing temperatures of 200° to 300° F.

Visual observations of these films show that, in general, the films of Examples 30 to 43 inclusive have at least sufficient clarity for suitable use in packaging applications where easily seen-through packages are desired. The clarity ratings for these films are shown in the following ratings where the films are identified by the example numbers in parentheses: very good (30, 31 and 39); good (33, 34, 36 to 38, and 40 to 43 inclusive); slightly hazy (32) and hazy (35). The films of Examples 30 to 43 inclusive are found to have good to very good gloss. In general, from the standpoints of clarity and gloss the films of these examples compare favorably with polyvinyl chloride films, which range from between fair and good to excellent.

From the standpoints of degree and quickness of recovering from indentation when in stretched condition, the films of Examples 32 and 36 to 42 inclusive are found to have good elasticity; the films of Examples 31, 35 and 43 are found to have between fair and good elasticity; and the films of Examples 30, 33, and 34 are found to have fair elasticity.

The films of Examples 30 to 43 inclusive are useful for making hand wrapped packages having the films stretched about products including durable goods, e.g. hand tools, meat, poultry, fruits, and vegetables, alone and in combination with supports such as trays and the like.

The films of Examples 27 to 33 and 39, inclusive, are tested for packaging performance on an Automac A-44P machine set for wrapping at 40 packages per minute. The films of Examples 27 to 29 (outer layers of ethylene vinyl acetate interpolymers) are found to perform unsatisfactorily, even at substantially low rates. The films of Examples 30, 31, 32 and 39 are found to effectively stretch wrap at this high packaging rate, while the film of Example 33 is found effective at 28 packages per minute. The film of Example 43 exhibits unacceptably high slip and is found to unsatisfactorily perform at 40 packages per minute.

TABLE II

Part A

| Example No. | 27 | 28 | 29 | 30 | 31 | 32 | 33 | 34 |
| --- | --- | --- | --- | --- | --- | --- | --- | --- |
| Tubularly Inner A layer Polymeric Material | EVA (9.5%VA) | EVA (4.5%VA) | EVA (4.5%VA) | Ionomer A-1 | Ionomer A-1 | Ionomer A-1 | Ionomer A-1 | Ionomer A-1 |
| Thickness (mils) | 0.11 | 0.16 | 0.20 | 0.17 | 0.18 | 0.18 | 0.15 | 0.13 |
| Extruder Barrel temp. (° F) | 350 | 350 | 350 | 350 | 350 | 350 | 350 | 350 |
| Melt temp. (° F) | 350 | 350 | 350 | 350 | 350 | 350 | 350 | 350 |
| Tubularly Outer A layer Polymeric Material | EVA (9.5% VA) | EVA (4.5% VA) | EVA (4.5% VA) | Ionomer A-1[4] | Ionomer A-1[4] | Ionomer A-1[4] | Ionomer A-1[4] | Ionomer A-1[4] |
| Thickness (mils) | 0.11 | 0.16 | 0.20 | 0.17 | 0.18 | 0.18 | 0.15 | 0.13 |
| Extruder Barrel temp. (° F) | 350 | 350 | 350 | 350 | 350 | 350 | 350 | 350 |
| Melt temp. (° F) | 350 | 350 | 350 | 350 | 350 | 350 | 350 | 350 |
| B Layer Polymeric Material | EPR-EVA[1] | EPR-EVA[2] | EPR-EVA[3] | EPR-EVA[5] | EPR-EVA[6] | EPR-EVA[2] | EPR-EVA[3] | EPR-EVA[7] |
| Thickness (mils) | 0.49 | 0.75 | 0.91 | 0.82 | 0.87 | 0.84 | 0.70 | 0.63 |
| Extruder Barrel temp. (° F) | 350 | 350 | 350 | 350 | 350 | 350 | 350 | 350 |
| Melt temp. (° F) | 375–400 | 350 | 350 | 350 | 350 | 350 | 350 | 350 |
| Die Temperature (° F) | 375–400 | 375–400 | 375–400 | 350–375 | 350–375 | 350–375 | 350–375 | |
| Orifice diam. (inches) | 10 | 4 | 4 | 4 | 4 | 4 | 4 | 4 |
| Orifice gap (mils) | 90 | 45 | 45 | 45 | 45 | 45 | 45 | 45 |
| Blown Film Thickness (mils) | 0.71 | 1.08 | 1.30 | 1.16 | 1.23 | 1.20 | 1.00 | 0.89 |
| Blow up ratio | 2.7:1 | 3:1 | 3:1 | 3:1 | 3:1 | 3:1 | 3:1 | 3:1 |
| Take-off rate (ft./min.) | 115 | 29 | 22 | 24 | 23 | 24 | 29 | 32 |
| Tensile secant mod. (p.s.i.) | 20,000/ 16,430 | 8,855/ 11,365 | 10,000/ 10,000 | 13,300/ 12,200 | 11,500/ 10,575 | 12,200/ 12,200 | 11,820/ 13,685 | 12,630/ 14,115 |
| Ult. elongation (%) MD/TD | 210/560 | 200/>600 | 360/>600 | 285/430 | 170/470 | 250/550 | 380/415 | 180/470 |
| Tensile Str. (p.s.i.) MD/TD | 4857/2571 | 2571/1727 | 2846/2846 | 2750/2300 | 2600/2000 | 2950/2550 | 3300/4100 | 2950/3400 |

Part B

| Example No. | 35 | 36 | 37 | 38 | 39 | 40 | 41 | 42 | 43 |
| --- | --- | --- | --- | --- | --- | --- | --- | --- | --- |
| Tubularly Inner A Layer Polymeric Material | Ionomer A-1 | Ionomer A-1 | Ionomer A-1 | Ionomer A-1 | Ionomer A-1 | Ionomer A-1[4] | Ionomer A-1[4] | Ionomer A-1[4] | Ionomer A-3[16] |
| Thickness (mils) | 0.14 | 0.19 | 0.17 | 0.13 | 0.15 | 0.22 | 0.20 | 0.22 | 0.15 |
| Extruder | | | | | | | | | |

TABLE II-continued

| | | | | | | | | | |
|---|---|---|---|---|---|---|---|---|---|
| Barrel temp. (° F) | 350 | 350 | 350 | 350 | 350 | 350 | 350 | 350 | 350 |
| Melt temp. (° F) | 350 | 350 | 350 | 350 | 350 | 350 | 350 | 350 | 350 |
| Tubularly Outer A layer | | | | | | | | | |
| Polymeric Material | Ionomer A-1[4] | Ionomer A-1[4] | Ionomer A-1[4] | Ionomer A-1[4] | Ionomer A-1[4] | Ionomer A-1[4] | Ionomer A-1[4] | Ionomer A-1[4] | Ionomer A-3[16] |
| Thickness (mils) | 0.14 | 0.19 | 0.17 | 0.13 | 0.15 | 0.22 | 0.20 | 0.22 | 0.15 |
| Extruder | | | | | | | | | |
| Barrel temp. (° F) | 350 | 350 | 350 | 350 | 350 | 350 | 350 | 350 | 350 |
| Melt temp. (° F) | 350 | 350 | 350 | 350 | 350 | 350 | 350 | 350 | 350 |
| B Layer | | | | | | | | | |
| Polymeric Material | EPR-EVA[8] | EPR-EVA[9] | EPR-EVA[10] | EPR-EVA[11] | EPR-EVA[12] | EPR-EVA[13] | EPR-EVA[14] | EPR-EVA[15] | EPR-EVA[1] |
| Thickness (mils) | 0.68 | 0.88 | 0.81 | 0.61 | 0.70 | 1.01 | 0.93 | 1.01 | 0.70 |
| Extruder | | | | | | | | | |
| Barrel temp. (° F) | 350 | 350 | 350 | 350 | 350 | 350 | 350 | 350 | 350 |
| Melt temp. (° F) | 350 | 350 | 350 | 350 | 350 | 350 | 350 | 350 | 350 |
| Die Temperature (° F) | 350–375 | 350–375 | 350–375 | 350–375 | 350–375 | 350–375 | 350–375 | 350–375 | 350–375 |
| Orifice diam. (inches) | 4 | 4 | 4 | 4 | 4 | 4 | 4 | 4 | 4 |
| Orifice gap (mils) | 45 | 45 | 45 | 45 | 45 | 45 | 45 | 45 | 45 |
| Blown Film Thickness (mils) | 0.96 | 1.25 | 1.15 | 0.88 | 1.00 | 1.45 | 1.33 | 1.45 | 1.00 |
| Blow up rate | 3:1 | 3:1 | 3:1 | 3:1 | 2:1 | 3:1 | 3:1 | 3:1 | 3:1 |
| Take-off rate (ft./min.) | 29 | 23 | 25 | 33 | 29 | 20 | 22 | 20 | 29 |
| Tensile secant mod. (p.s.i.) | 13,335/ 11,430 | 9,200/ 8,460 | 9,550/ 10,000 | 18,800/ 16,800 | 18,000/ 15,800 | 12,200/ 8,665 | 11,000/ 11,540 | 10,700/ 10,000 | 13,685/ 12,380 |
| Ult. elongation (%) MD/TD | 165/400 | 125/395 | 210/380 | 125/350 | >500 | 380/500 | 160/470 | 210/520 | 230/490 |
| Tensile Str. (p.s.i.) MD/TD | 3450/2100 | 2500/2000 | 2570/217 | 3080/3900 | 4050/4200 | 3150/2530 | 2780/2780 | 3120/2640 | 3895/3145 |

[1]Blend of Elastomer EP-1 (an elastomeric ethylene-propylene interpolymer described hereinbefore) and an ethylene vinyl acetate interpolymer including about 4.5 percent vinyl acetate units and having a melt index of about 2 g./10 min. in a parts ratio of 1:1 in the order given.
[2]Same as note 1 except 7:3 parts ratio
[3]Same as note 1 except 3:7 parts ratio
[4]The ionomer includes one percent erucamide mixed therein by melt extrusion.
[5]Same as note 1 except 9:1 parta ratio
[6]Same as note 1 except 8:2 parts ratio
[7]Same as note 1 except 2:8 parts ratio
[8]Same as note 1 except 1:9 parts ratio
[9]Blend of Elastomer EP-1 and an ethylene vinyl acetate interpolymer including about 9.5 percent vinyl acetate units and having a melt index of about 3 g./10min. in a parts ratio of 9:1 in the order given.
[10]Same as note 9 except 8:2 parts ratio
[11]Same as note 9 except 7:3 parts ratio
[12]Same as note 9 except 1:1 parts ratio
[13]Same as note 9 except 3:7 parts ratio
[14]Same as note 9 except 2:8 parts ratio
[15]Same as note 9 except 1:9 parts ratio
[16]The ionomer (described hereinabove) has slip and anti-block agents admixed therewith as supplied commercially

EXAMPLE 44

Unexpectedness of the present invention is illustrated by this example.

(A) Ionomer Film.

A hot blown ultra-thin tubular film having thickness of about 0.15 mil is prepared of Ionomer A-1 by extruding the ionomer at a rate of 17.9 pounds per hour through an extruder having a 17:1 ratio of L/D and a diameter of ¾ inch. The extruder is equipped with a cooling ring supplied with air at about 32° F. and a die having an annular orifice of 4 inches in average diameter and gap thickness of about 35 mils (i.e., 0.035 inch). Other operating conditions are an extruder barrel temperature of 350° F., a die temperature of 400° F., a blow-up ratio of about 3:1, and deflated tube wind-up rate of about 125 feet per minute of 18-inch lay-flat width of the film. Stress-strain data shows that the ultra-thin ionomer film has tensile strengths of about 8670 p.s.i. in the machine direction (MD) and about 8670 p.s.i. in the transverse direction (TD), percent elongations at rupture of about 30 (MD) and 100 (TD), and tensile secant moduli of about 66,670 p.s.i. (MD) and 63,330 p.s.i. (TD). This film is referred to hereinafter as the Ionomer Film.

(B) Elastomer Film.

A hot blown thin double-wall tubular film having thickness of about 0.7 mil is prepared of the new elastomeric composition used in the B layer of Example 27 (1:1 blend of Elastomer EP-1 and an ethylene-vinyl acetate interpolymer), hereinafter designated Blend EP-1/EVA, by extruding the blend at a rate of 11.6 pounds per hour through an extruder having a 17:1 ratio of L/D and a diameter of ¾ inch. The extruder is equipped with a cooling ring supplied with air at about 40° F. and a die having an annular orifice of 4 inches in average diameter and gap thickness of about 35 mils. Other operating conditions are an extruder temperature of 300° F., a die temperature of 350° F., a blow-up ratio of about 3:1, and deflated tube wind-up rate of about 31 feet per minute of about 20-inch lay-flat width of the film. Stress-strain data shows that the resulting thin film has tensile strengths of about 4465 p.s.i. in the machine direction (MD) and about 3930 p.s.i. in the transverse direction (TD), percent elongations at rupture of about 160 (MD) and about 420 (TD), and tensile secant moduli of about 18,670 p.s.i. (MD) and about 17,145 p.s.i. (TD). This film is hereinafter referred to as the Elastomer Film.

(C) Laminated A-B Film.

A composite extensible film of the present invention having an A-B construction is prepared by laminating a portion of the .015-mil pre-formed blown film of Ionomer A-1 (the Ionomer Film) to a surface of a portion of the 0.7-mil pre-formed blown film of the elastomeric Blend EP-1/EVA (the Elastomer Film) using hand pressure at about 70° F. Stress-strain data shows that the resulting approximately 0.85-mil laminated A-B film has tensile strengths of about 4100 p.s.i. in the machine direction (MD) and about 2555 p.s.i. in the transverse direction (TD), percent elongations at rupture of about 195 (MD) and about 100 (TD), and tensile secant moduli of about 17,000 p.s.i. (MD) and about 17,780 p.s.i. (TD).

This extensible composite film, referred to herein as Laminated A-B Film, is judged suitable for stretch overwrapping product in handwrap and high-speed machine packaging applications, including such applications for which flexible films of plasticized polyvinyl chloride have heretofore been used.

(D) Laminated A-B-A Film.

Film of the present invention having an A-B-A construction is prepared by laminating two portions of the 0.15-mil pre-formed blown film of Ionomer A-1 (Ionomer Film) to opposite surfaces of a portion of the 0.7-mil pre-formed blown film of the elastomeric Blend EP-1/EVA (Elastomer Film) using hand pressure at about 70° F. Stress-strain data shows that the resulting approximately one-mil laminated A-B-A film has tensile strengths of about 5740 p.s.i. in the machine direction (MD) and about 4740 p.s.i. in the transverse direction (TD), percent elongations at rupture of about 115 (MD) and about 315 (TD), and tensile secant moduli of elasticity of about 26,670 p.si. (MD) and about 23,160 p.s.i. (TD). This extensible composite film is herein designated Laminated A-B-A Film.

(E) Hot Blown Coextruded A-B-A Film.

A thin hot blown coextruded A-B-A film of the present invention having thickness of about 1.1 mil is prepared using substantially the same method of Example 21. The B layer is of elastomeric Blend EP-1/EVA, about 0.77 mil in thickness and each A layer is of Ionomer A-1, about 0.17 mil in thickness, thereby providing a coextruded film having a ratio of thickness of the B layer to the thickness of each A layer which is substantially the same as the corresponding ratio for the Laminated A-B-A Film. The inner B layer is formed by extruding the blend at a rate of 85 pounds per hour through a first extruder having a 20:1 ratio of L/D and a diameter of 2 inches operated at a barrel temperature of 325° to 350° F. and a discharged melt temperature of 350° to 375° F. Extrusion of each outer A layer, one of which is the inner layer of the tubular extrudate, is at a rate of 22 pounds per hour through second and third extruders, each having a ratio of 20:1 of L/D and a diameter of 2 inches, each operated at a barrel temperature of 325° to 340° F. and a discharged melt temperature of 330° to 375° F. The cooling ring is supplied with air at about 40° F. The die, including an annular orifice having average diameter of 10 inches and gap thickness of about 90 mils, is controlled at about 325° to 375° F. The blow-up ratio is about 2.5:1 and the deflated tube wind-up rate is about 61 feet per minute of 40-inch lay-flat width film. This thin film is hereinafter referred to as the Hot Blown Coextruded A-B-A Film.

Surprisingly, tests show that the ultimate elongations of the resulting thin Hot Blown Coextruded A-B-A Film in each of the MD (410 percent) and TD (520 percent) are more than the ultimate elongations of the least extensible component layer when prepared as a hot blown single-layer film, as shown by comparison with the 30 percent MD and 100 percent TD ultimate elongations of the Ionomer Film described above in part (A) of this example. Persons of ordinary skill in the art would not expect the ultimate elongation of a multilayer film to exceed the ultimate elongation of a single-layer film prepared of the least extensible component layer. It is further surprisingly found that the ultimate elongations of the Hot Blown Coextruded A-B-A Film exceed the ultimate elongations of the more extensible component layer when prepared as a hot-blown single-layer film, as shown by comparison with the 160 percent MD and 420 percent TD ultimate elongations of the Elastomer Film described above in part (B) of this example. The results show that the present elastomeric interpolymer composition synergistically cooperates with the ionomeric interpolymer under hot blown coextrusion conditions to impart improved and unexpected extensibility properties to composite film formed of interfacially engaged layers of the interpolymer compositions.

Tests show that the tensile secant moduli of the Laminated A-B-A Film of this example are about 26,665 p.s.i (MD) and about 23,160 p.s.i. (TD) and thus within a suitable but not most preferred range of this property.

Tests show that the tensile secant moduli of the Hot Blown Coextruded A-B-A Film of this example are about 11,400 p.s.i. (MD) and about 10,900 p.s.i. (TD). These tensile secant moduli are unexpectedly lower than those of the Laminated A-B-A film and unexpectedly characterize the Hot Blown Coextruded A-B-A Film as within a tensile secant moduli range especially preferred herein.

The data shows that films of the present invention prepared by the present hot blown coextrusion process are superior to the present films when not so prepared.

In the foregoing Examples 2 to 9, 13, 20 to 24, and 27 to 44 inclusive, the stress-strain graphs show that the stress is substantially directly proportional to the strain in the range from 1 to 10 percent strain, and accordingly the tensile secant moduli at one percent strain are substantially the same as the above tensile secant moduli values calculated at 10 percent strain. As a result of slight departures from direct proportionality of stress to strain in the range from 1 to 10 percent strain for the films of Examples 10 to 12 and 14 to 19 inclusive, the tensile secant moduli at one percent strain are slightly higher than the moduli values shown for these films.

EXAMPLE 45

The unexpectedness of the present invention is further illustrated by this example which at the same time illustrates the high degree of elasticity of the present films.

The various films of Example 44 are tested for elasticity when in a stretched taut condition simulating the film condition when stretched about a product to form packages of the present invention. The test is performed by stretching a sample sheet of film in taut condition over a cylindrical plastic dish, about 3½ inches in diameter, and observing the degree of film return after slowly indenting the taut film to various penetration depths by means of a smooth rod about ½ inch in diameter. A test sheet of film, marked with a 1-inch × 1-inch square area is placed over the mouth of the dish with the marked area centered over the mouth. The film is then stretched uniformly until the marked area is enlarged to a square of 1¼ inch by 1¼ inch. Indentation is effected to the depth desired within about 30 seconds, the rod is removed, and the degree of elastic recovery is observed within a brief period of approximately one minute after removal of the rod. Separate sample sheets of each film are indented to depths from ¼ inch to ¾ inch in increments of 1/16 inch.

The Ionomer Film is found to recover 100 percent for indentations of up to ½ inch inclusive. The Elastomer Film is found to recover 100 percent for indentations of up to ⅜ inch inclusive. Unexpectedly, 100 percent recovery is observed for the Laminated A-B Film, the Laminated A-B-A Film, and the Hot Blown Coextruded A-B-A Film for indentations of up to 7/16 inch inclusive. Recoveries of more than 85 percent are observed for the three latter films of this invention at ½-inch indentation. The data shows that the component layers cooperate to form films of this invention having unexpected and highly suitable degrees of elasticity, thereby providing commercially attractive stretch films which are well adapted for forming overwrapped produce and poultry packages having the good recovery properties required by many users.

Films of the present invention may be irradiated at any suitable energy level, as may be desired.

The present film may include one or more layers of elastomeric composition, if desired. Where two or more layers of elastomeric composition are included, they may de disposed, for example, in mutual interfacial contact or in spaced-apart relationship with one or more layers of any suitable material disposed intermediate the layers of elastomeric composition. The intermediate layers may be extensible layers of, for example, the polymeric composition included in a sealable layer. Films of this embodiment may be prepared by hot blown coextrusion of a film of A-B-A laminar construction followed by deflating the tubular film in the nip of a pair of rolls adapted to effect mutual interfacial sealing of opposed portions of the tubularly inner layer of the now flattened tubular film. The resulting film is of A-B-A-B-A construction. In another method for forming film of this embodiment, the various film layers are supplied through appropriate die stations of a plural station die having at least five stations using coextrusion procedures similar to those described hereinabove.

"Film-forming" as used in this invention refers to a material which will provide a self-supporting film of the material when cast or extruded, for example, when extruded in sheets of from about 0.1 mil to about 10 mils in thickness.

It is to be understood that the foregoing detailed description is given merely by way of illustration and numerous modifications may be made therein without departing from the spirit or scope of the present invention.

What is claimed is:

1. A substantially unoriented composite laminar film having a 10 percent tensile secant modulus of from about 1,000 to about 30,000 pounds per square inch which comprises:
   a first layer of elastomeric polymeric composition; and
   a sealable layer of a polymeric composition comprising an interpolymer of ethylene and alkenoic acid; and wherein,
   said elastomeric polymeric composition comprises a material selected from the group consisting of elastomeric interpolymer of ethylene with an alpha-mono-olefin having from 3 to about 8 carbon atoms per molecule, elastomeric interpolymers of styrene with a conjugated diene, elastomeric interpolymers of ethylene and a vinyl ester of carboxylic acid having from 2 to about 5 carbon atoms per molecule, elastomeric polyurethanes, elastomeric polyesters, elastomeric polyethers, and mixtures thereof; and wherein
   said alkenoic acid interpolymer is selected from ionomeric salts of interpolymers of ethylene and an alpha, beta-ethylenically unsaturated carboxylic acid having from 3 to about 10 carbon atoms.

2. The film of claim 1 further including a second sealable layer of a polymeric composition comprising an interpolymer of ethylene and alkenoic acid with said first layer disposed intermediate the sealable layers.

3. The film of claim 1 wherein the film has a ten percent tensile secant modulus of from about 1,000 to about 14,950 pounds per square inch.

4. The film of claim 1 wherein the film has a ten percent tensile secant modulus of from about 1,000 to about 14,950 pounds per square inch.

5. The film of claim 2 wherein both of the sealable layer are comprised of a polymeric composition comprising an ionomeric inorganic salt of an interpolymer of ethylene and an ethylenically unsaturated carboxylic acid having from 3 to about 10 carbon atoms.

6. The film of claim 5 wherein the carboxylic acid is methacrylic acid.

7. The film of claim 6 wherein the salt is a sodium salt.

8. The film of claim 6 wherein the salt is a zinc salt.

9. The film of claim 8 having less than 35 percent of the carboxy (HOOC—) groups in the methacrylic acid neutralized with zinc.

10. The film of claim 8 wherein from about 10 to about 45 percent of the carboxy (HOOC—) groups in the methacrylic acid are neutralized with zinc, the melt index of the ionomeric salt interpolymer is from about 1 to about 20 grams per 10 minutes, and the total weight of the carboxy groups and the neutralized carboxy groups is from about 5 to about 20 parts by weight expressed as methacrylic acid units per 100 parts by total weight of the ionomeric interpolymer moiety consisting of ethylene units, methacrylic acid units, and neutralized methacrylic acid units expressed as units of methacrylic acid.

11. The film of claim 1 wherein the elastomeric polymeric composition comprises an elastomeric blend of (I) an elastomeric interpolymer of ethylene and propylene with (II) a polymer selected from the group consisting of (A) low density polyethylene having a density of from about 0.91 to about 0.925 gram per cubic centimeter and (B) interpolymers of ethylene and vinyl acetate including from about 2 to about 30 percent by weight of vinyl acetate units.

12. The film of claim 11 wherein the blend comprises (I) from about 1 part to about 99 parts by weight of an elastomeric interpolymer of ethylene in an amount from about 20 to about 77.5 percent by weight of ethylene units and propylene in an amount from about 80 to about 22.5 percent by weight of propylene units and (II) from about 99 parts to about 1 part by weight of an interpolymer of ethylene in an amount from about 98 to about 70 percent by weight of ethylene units and vinyl acetate in an amount from about 2 to about 30 percent by weight of vinyl acetate units.

13. The film of claim 11 wherein the blend comprises (I) from 1 part to about 99 parts by weight of an elastomeric interpolymer of ethylene in an amount from about 20 to about 77.5 percent by weight of ethylene units and propylene in an amount from about 80 to about 22.5 percent by weight of propylene units and (II) from about 99 parts to about 1 part by weight of low density polyethylene having a density of from about 0.91 to about 0.925 gram per cubic centimeter.

14. The film of claim 1 wherein the elastomeric polymeric composition comprises an elastomeric interpolymer of ethylene and vinyl acetate including from about 1 to about 40 percent by weight of vinyl acetate units.

15. The film of claim 1 wherein the elastomeric polymeric composition comprises an elastomeric interpolymer of styrene and butadiene.

16. The film of claim 1 wherein the elastomeric polymeric composition comprises an elastomeric interpolymer of ethylene and propylene.

17. The film of claim 1 having ultimate extensibility of at least 100 percent.

18. The film of claim 1 having ultimate extensibility of from about 175 to about 485 percent.

19. The film of claim 1 having tensile strength of from about 3,000 to about 5,000 p.s.i.

20. The film of claim 1 having shrink energy of less than 50 p.s.i.

21. The film of claim 2 wherein the outer surface of at least one of said sealable layers has a static coefficients of friction to metal, polyamide and polyester in the range from about 0.3 to about 0.6.

22. The film of claim 2 wherein the total thickness of the film is from about 0.5 ml to about 3 mils and the ratio of thickness in mil units of said first layer to the thickness in mil units of each of said sealable outer layers is from about 1:2 to about 20:1.

23. The film of claim 5 wherein said elastomeric polymeric composition in said first layer is a blend comprising (I) from about 1 part to about 99 parts by weight of an elastomeric interpolymer of ethylene in an amount from about 20 to about 77.5 percent by weight of ethylene units and propylene in an amount from about 80 to about 22.5 percent by weight of propylene units and (II) from about 99 parts to about 1 part by weight of an interpolymer of ethylene in an amount from about 99 to about 70 percent by weight of ethylene units and vinyl acetate in an amount from about 2 to about 30 percent by weight of vinyl acetate units.

24. The film of claim 23 wherein each of said sealable layers is of a polymeric composition comprising a zinc ionomer of an interpolymer of ethylene and about 14 to about 16 percent by weight methacrylic acid, said ionomer having a degree of neutralization of from about 20 to about 24 percent and a melt index of from about 12 to about 16 grams per 10 minutes.

25. The film of claim 24 having a ten percent tensile secant modulus of from about 1,000 to about 30,000 p.s.i.

26. The film of claim 24 having a ten percent tensile secant modulus of from about 6,000 to about 14,950 p.s.i., an ultimate elongation of from about 175 to about 485 percent, a tensile strength of from about 3,000 to about 5,000 p.s.i., static coefficients of friction of each outer surface to metal, polyamides and polyesters of from about 0.3 to about 0.6, and thickness of from about 0.5 mil to about 3 mils.

27. The film of claim 5 wherein the elastomeric polymeric composition in said first layer is an elastomeric interpolymer of styrene and butadiene.

28. The film of claim 27 wherein each of said sealable layers is of a polymeric composition comprising a zinc ionomer of an interpolymer of ethylene and about 14 to about 16 percent by weight methacrylic acid, said ionomer having a degree of neutralization of from about 20 to about 24 percent and a melt index of from about 12 to about 16 grams per 10 minutes.

29. The film of claim 28 having a ten percent tensile secant modulus of from about 1,000 to about 30,000 p.s.i.

30. The film of claim 28 having a ten percent tensile secant modulus of from about 6,000 to about 14,950 p.s.i., an ultimate elongation of from about 175 to about 485 percent, a tensile strength of from about 3,000 to about 5,000 p.s.i., static coeffcients of friction of each outer surface to metal, polyamides and polyesters of from about 0.3 to about 0.6, and thickness of from about 0.5 ml to about 3 mils.

31. The film of claim 27 wherein the styrene-butadiene interpolymer is a thermoplastic block copolymer having polystyrene end blocks.

* * * * *

UNITED STATES PATENT OFFICE
CERTIFICATE OF CORRECTION

Patent No. 4,082,877            Dated 4/04/78

Inventor(s) Shadle, Robert James

It is certified that error appears in the above-identified patent and that said Letters Patent are hereby corrected as shown below:

Claim 1, line 12, change "interpolymer" to "interpolymers"

Claim 22, line 2, change "ml" to "mil"

Claim 30, line 8, change "ml" to "mil"

Signed and Sealed this

Sixth Day of February 1979

[SEAL]

Attest:

RUTH C. MASON
Attesting Officer

DONALD W. BANNER
Commissioner of Patents and Trademarks